US010708956B2

(12) United States Patent
Rico Alvarino et al.

(10) Patent No.: US 10,708,956 B2
(45) Date of Patent: Jul. 7, 2020

(54) PHYSICAL LAYER ENHANCEMENTS FOR EARLY DATA TRANSMISSION

(71) Applicant: QUALCOMM Incorporated, San Diego, CA (US)

(72) Inventors: Alberto Rico Alvarino, San Diego, CA (US); Umesh Phuyal, San Diego, CA (US); Le Liu, Fremont, CA (US); Xiao Feng Wang, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/113,476

(22) Filed: Aug. 27, 2018

(65) Prior Publication Data
US 2019/0159257 A1 May 23, 2019

Related U.S. Application Data

(60) Provisional application No. 62/588,284, filed on Nov. 17, 2017.

(51) Int. Cl.
H04W 74/08 (2009.01)
H04L 1/00 (2006.01)
H04W 72/04 (2009.01)

(52) U.S. Cl.
CPC ....... *H04W 74/0833* (2013.01); *H04L 1/0003* (2013.01); *H04W 72/04* (2013.01)

(58) Field of Classification Search
CPC . H04W 74/0833; H04W 72/04; H04W 74/08; H04W 72/1215; H04W 16/14;
(Continued)

(56) References Cited

U.S. PATENT DOCUMENTS

2015/0049712 A1* 2/2015 Chen ................ H04L 27/0006
370/329
2017/0325205 A1* 11/2017 Zhou ................ H04W 72/042
2019/0320467 A1* 10/2019 Freda ............... H04W 74/0833

FOREIGN PATENT DOCUMENTS

WO 2016115667 A1 7/2016
WO WO-2016115667 A1 * 7/2016 ............ H04W 28/16

OTHER PUBLICATIONS

Nokia et al: data transmission during random access; 3gpp r1-1717229-Oct. 8, 2017 (Year: 2017).*
(Continued)

Primary Examiner — Hardikkumar D Patel
(74) Attorney, Agent, or Firm — Nerrie M. Zohn

(57) ABSTRACT

Various features presented herein facilitate early data transmission (EDT) in eMTC and NB-IoT. In certain aspects, a UE (e.g., an eMTC and/or NB-IoT type device), may receive an indication in a SIB from a base station that may enable EDT by the UE. The UE may transmit a random access request based on the SIB. The UE may further receive an MCS index in an RAR, and transmit a connection request (e.g., Msg3) to the base station based on the MCS index and the indication in the SIB. Some aspects described herein relate to an improved rate matching technique. In certain aspects, a UE may be configured to transmit a connection request message to a base station based on at least one of an increased number of RVs than a number of RVs for other transmissions from the UE or rate matching performed across more than one subframe.

37 Claims, 15 Drawing Sheets

(58) Field of Classification Search
CPC ... H04L 1/0003; H04L 27/00; H04L 27/0006; H04L 5/001; H04L 5/003
See application file for complete search history.

(56) References Cited

OTHER PUBLICATIONS

International Search Report and Written Opinion—PCT/US2018/048359—ISA/EPO—dated Nov. 23, 2018.
Nokia et al., "Data Transmission During Random Access Procedure", 3GPP Draft, R1-1717229, 3rd Generation Partnership Project (3GPP), Mobile Competence Centre, 650, Route Des Lucioles, F-06921 Sophiaantipolis Cedex, France, RAN WG1, Prague, Czech Republic, Oct. 8, 2017 (Oct. 8, 2017), XP051340420, 3 Pages.
Qualcomm Incorporated: "UL Early Data Transmission", 3GPP Draft; R2-1708239, 3rd Generation Partnership Project (3GPP), Mobile Competence Centre, 650, Route Des Lucioles, F-06921 Sophia-Antipolis Cedex, France, RAN WG2, Berlin, Germany, Aug. 20, 2017 (Aug. 20, 2017), XP051318141, 13 Pages.

\* cited by examiner

| MCS index | Modulation $\Delta f = 3.75$ KHz or 15 KHz, and $I_{sc} = 0, 1, 2, ..., 11$ | Modulation $\Delta f = 15$ KHz, and $I_{sc} > 11$ | Number of RUs ($N_{RU}$) | TBS (bits) |
|---|---|---|---|---|
| 000 | Pi/2 BPSK | QPSK | 4 | 88 |
| 001 | Pi/4 QPSK | QPSK | 3 | 88 |
| 010 | Pi/4 QPSK | QPSK | 1 | 88 |
| 011 | reserved | reserved | reserved | reserved |
| 100 | reserved | reserved | reserved | reserved |
| 101 | reserved | reserved | reserved | reserved |
| 110 | reserved | reserved | reserved | reserved |
| 111 | reserved | reserved | reserved | reserved |

PHYSICAL LAYER ENHANCEMENTS FOR EARLY DATA TRANSMISSION

CROSS-REFERENCE TO RELATED APPLICATION(S)

This application claims the benefit of U.S. Provisional Application Ser. No. 62/588,284 entitled "PHYSICAL LAYER ENHANCEMENTS FOR EARLY DATA TRANSMISSION" filed on Nov. 17, 2017, which is expressly incorporated by reference herein in its entirety.

BACKGROUND

Technical Field

The present disclosure relates generally to communication systems, and more particularly, to methods and apparatus related to physical layer enhancements for early data transmission.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. For example, there exists a need for enhancements in wireless communications that allow and/or improve early data transmission. Techniques that facilitate early data transmission with machine type communications are desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

There has been an increased interest in application and deployment of devices that utilize narrow bands (NBs) for communication, such as enhanced Machine Type Communication (eMTC) and/or Narrow Band Internet of Things (NB-IoT) devices. Furthermore, early data transmission (EDT) may improve performance and battery life of eMTC and NB-IoT devices by allowing data transmission in an uplink message during a random access channel (RACH) procedure without requiring establishment of an active RRC Connection. For example, some aspects presented herein enable a RACH connection request (Msg3) allocation to be increased to accommodate EDT.

In an aspect of the disclosure, a method, a computer-readable medium, and an apparatus are provided. The apparatus, e.g., a user equipment (UE), may be configured to receive an indication of at least one parameter (e.g., associated with a random access response grant) in a System Information Block (SIB) from a base station. The UE may transmit a random access request to the base station and receive a Modulation and Coding Scheme (MCS) index in a random access response from the base station. The UE may then transmit a connection request message to the base station based on the MCS index and the indication received in the SIB.

In an aspect of the disclosure, a method, a computer-readable medium, and an apparatus are provided. The apparatus, e.g., a base station, may be configured to transmit an indication of at least one parameter associated with a random access response grant in a SIB. The base station may receive a random access request from a UE and transmit an MCS index in a random access response to the UE. In one configuration, the base station may further receive, from the UE, a connection request message based on the MCS index and the indication transmitted in the SIB.

In an aspect of the disclosure, a method, a computer-readable medium, and an apparatus are provided. The apparatus, e.g., a UE, may be configured to transmit a random access request to a base station and receive a random access response from the base station. In one configuration, the UE may then transmit a connection request message to the base station based on at least one of an increased number of redundancy version than a redundancy version for other transmissions from the user equipment or rate matching performed across more than one subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
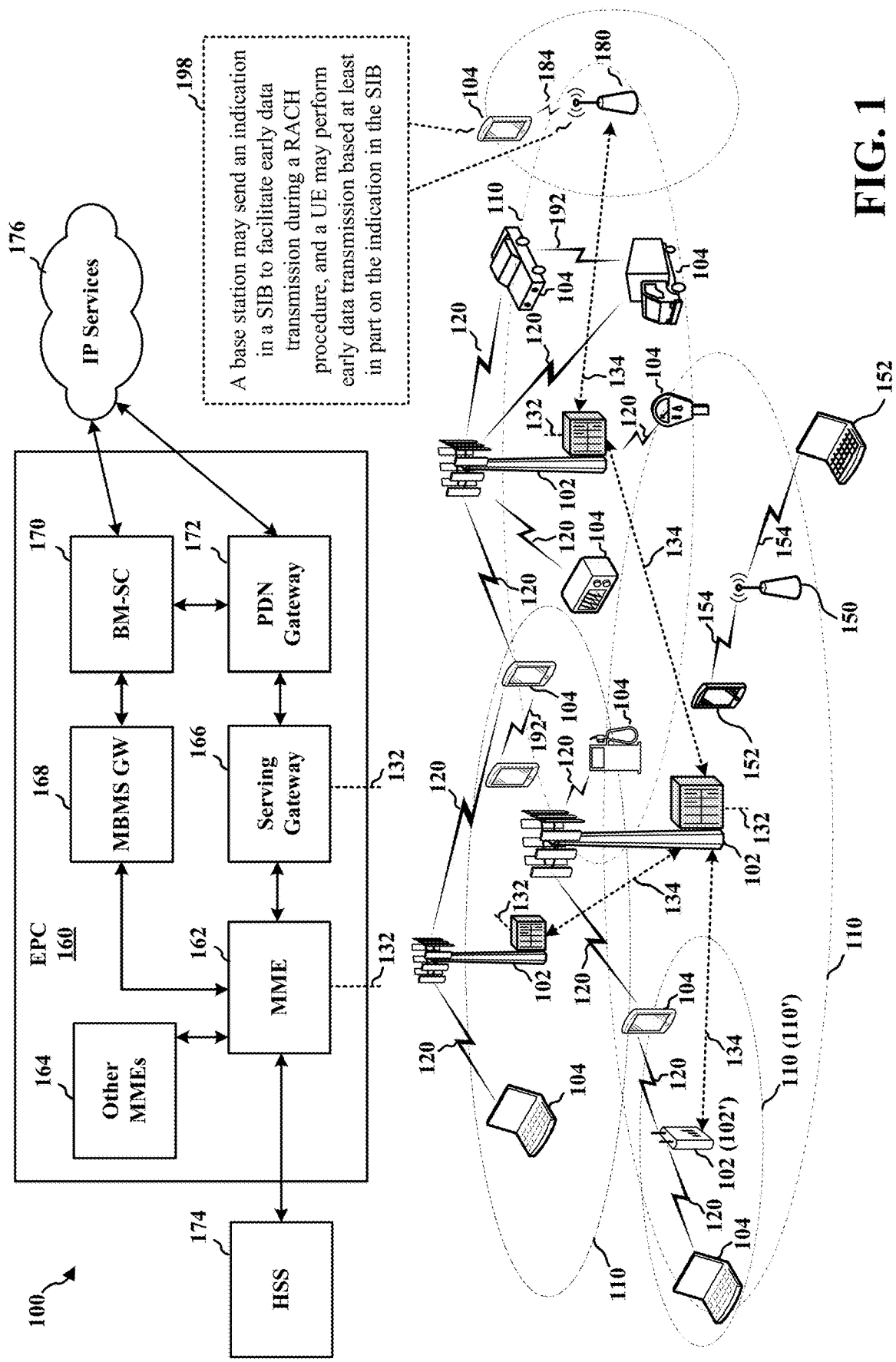
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and base station 180 may support early data transmission (198). In one aspect, the base station 180 may transmit an indication in a SIB to facilitate early data transmission, e.g., during a RACH procedure, and the UE 104 may perform early data transmission based at least in part on the indication in the SIB (198), as described in more detail in connection with FIGS. 4-15. Various additional features in this context are discussed in more detail infra.

Figure 2:
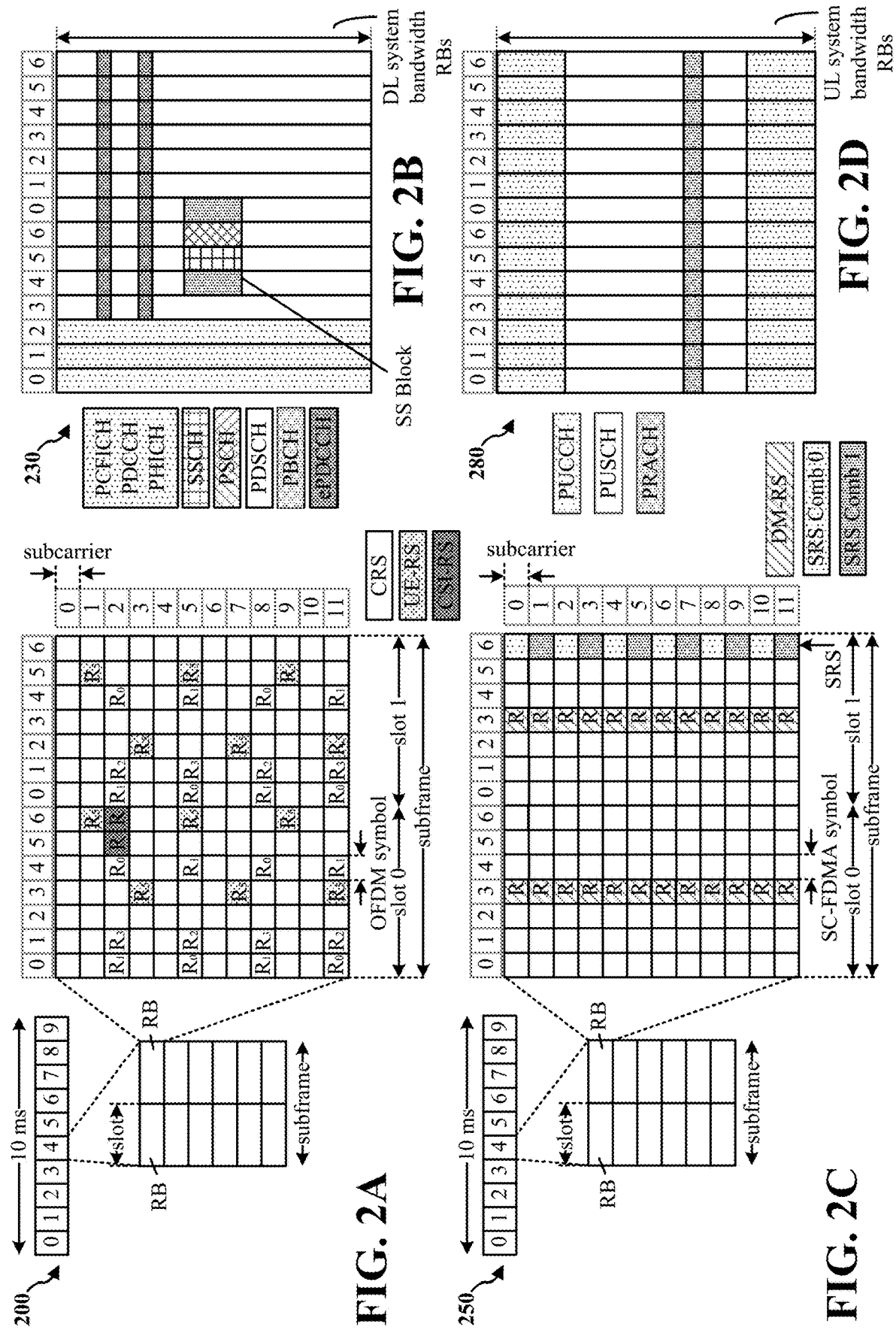
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
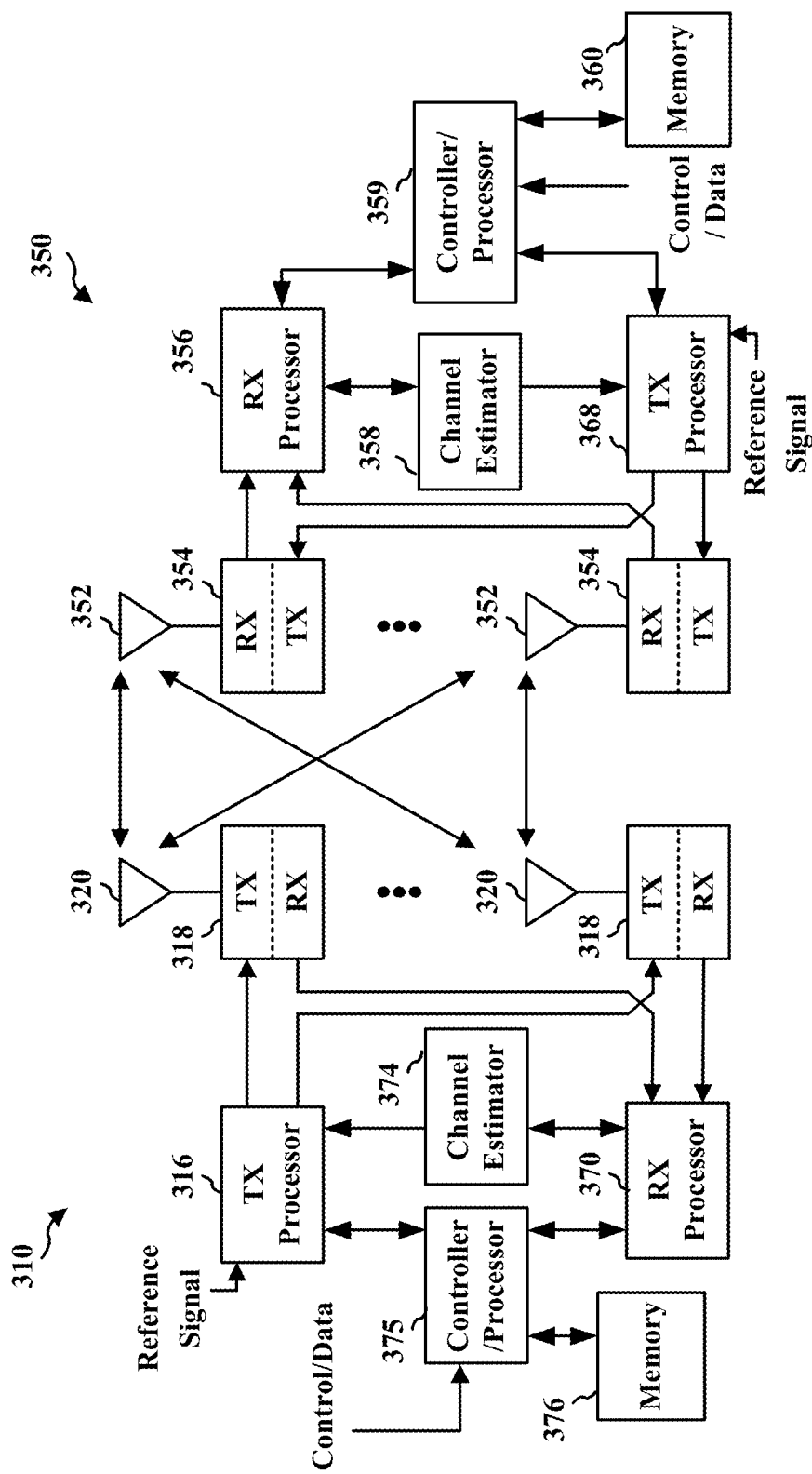
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

There has been an increased interest in application and deployment of devices that utilize narrow bands (NBs) for communication, such as enhanced Machine Type Communication (eMTC) and/or Narrow Band Internet of Things (NB-IoT) devices. Furthermore, early data transmission in eMTC and NB-IoT is being explored to allow for data transmission in an uplink message during the RACH procedure.

A UE that may be trying to access a wireless cellular network (e.g., trying to get connected) may initiate a RACH procedure for initial network access. Because the UE may not be connected to the network, the UE may not have allocated resources available to inform the network about its desire to connect. Instead, the UE may send a request over a shared medium—the RACH. If the UE is a NB-IoT and/or eMTC device, the shared medium that may be used is a NB-IoT physical random access channel (NPRACH).

Figure 4:
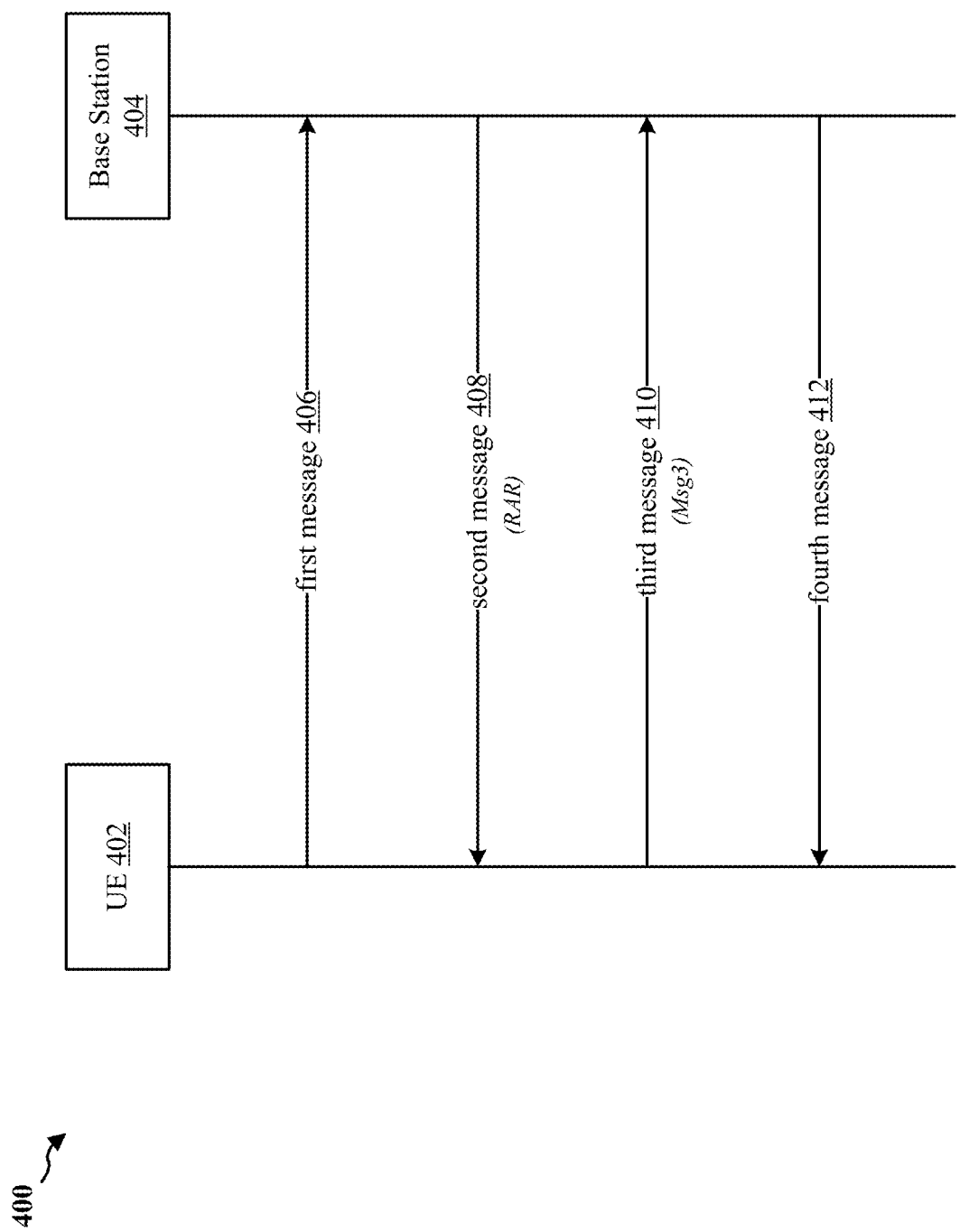
FIG. 4 is a diagram illustrating communication between a UE and a base station engaged in a random access procedure.

In a contention-based RACH procedure, the UE may send a RACH transmission to a base station (e.g., an eNB) and listen for a RACH response (RAR) message. In the RAR, the base station may assign resources to the UE for transmitting the next message to the base station as part of the RACH procedure. The UE may send a connection request/third message (also sometimes referred to as Msg3) in response to the RAR message over an uplink shared channel (UL SCH) resources identified in the RAR message. FIG. 4 is a diagram 400 illustrating an example RACH procedure in accordance with certain aspects described herein. A UE 402 (e.g., a NB-IoT or eMTC type device) may engage in a contention-based RACH procedure with a base station 404. The RACH procedure may include a message exchange between the UE 402 and the base station 404—a first message 406 (e.g., Msg1), a second message 408 (e.g., Msg2), a third message 410 (e.g., Msg3), and a fourth message 412. In an aspect, the UE 402 may select an available RACH preamble for transmitting in the first message 406. The UE 402 may select the signature based on a size of the transmission resource needed for transmitting the third message 410 (Msg3). The selected signature (or preamble) may be transmitted by the UE 402 to the base station 404 in the first message 406 (also referred to as the NPRACH in the context of NB-IoT).

In response to receiving the first message 406, the base station 404 may transmit the second message 408 to the UE 402. The second message 408 may be a RAR message sent, e.g., via the PDSCH. The second message 408 may provide, among other things, an initial uplink resource grant and indicate an MCS index for the UE 402 to transmit the third message 410 (Msg3). The indicated MCS index in the RAR message 408 may allow the UE to understand the grant in the RAR message 408 and determine the modulation and coding scheme, a number of resource units (RUs), and the transport block size (TBS) for Msg3 transmission. This may be achieved by the UE 402 by performing a table lookup (e.g., such as the table 502 and other tables discussed below) using the indicated MCS index. For example, based on the indicated MCS index in the RAR message (Msg2), the UE may perform a table lookup and determine the modulation, the number of resource units, and the TBS for transmitting Msg3. As discussed infra, in certain aspects, the table may be predefined and preconfigured in the UE 402.

The UE 402 may then transmit the third message 410 (Msg3) to the base station 404, e.g., based on the determined number of resource units. The third message 410 may include an RRC connection request message. After receiving the third message 410, the base station 404 may transmit the fourth message 412 to the UE 402. The fourth message 412 may be a contention resolution message.

In some conventional systems, Msg3 carries just an RRC connection request which may have a very small payload. For example, currently for Msg3, a transport block size of 88 bits may be allowed, in some systems. However, it is desirable to utilize early data transmission with eMTC and/or NB-IoT. For a variety of applications, it may be desirable to transmit application data using Msg3 as discussed in more detail below. In accordance with various aspects of the proposed techniques described herein, allocation for Msg3 (e.g., in terms of number of resource units, TBS, etc.) may be increased allowing a UE to use flexible transport block sizes and/or other parameters for Msg3 transmission.

Figure 5:
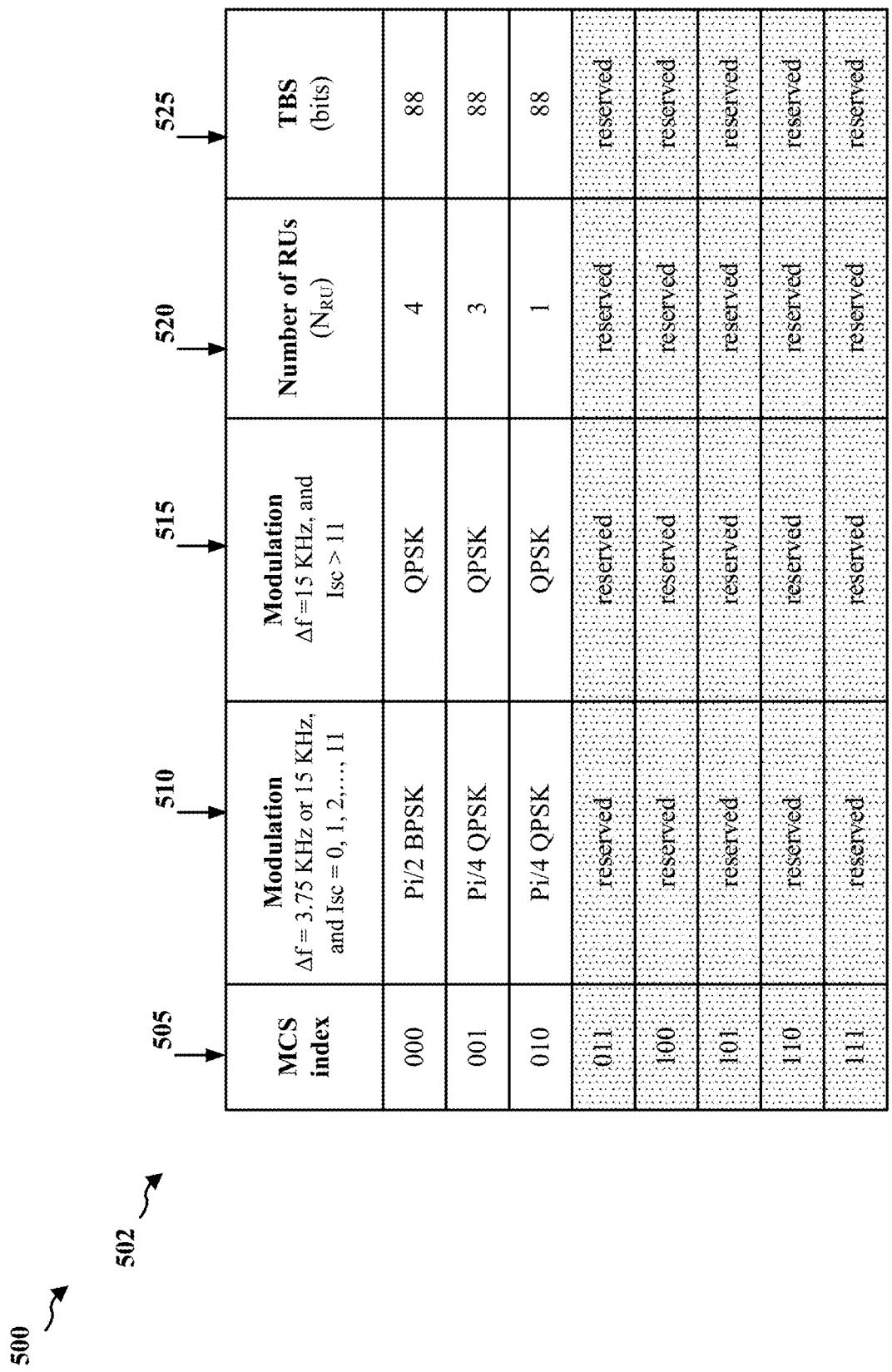
FIG. 5 illustrates an example information table that may be used for interpreting a random access response grant for transmission of a connection request message (e.g., Msg3).

FIG. 5 illustrates a diagram 500 showing an information table 502 for interpreting an RAR grant for transmission of Msg3, in accordance with one aspect. The first column 505 corresponds to MCS index information and each entry in the first column 505 indicates an MCS index. The second column 510 corresponds to modulation information (for subcarrier spacing $\Delta f=3.75$ KHz or 15 KHz, and subcarrier indication of subcarrier allocation Isc=0, 1, 2, 11), and each entry in the second column 510 indicates a modulation technique that may be used by a UE based on the MCS index indicated to the UE (e.g., in an RAR message). The third column 515 corresponds to modulation information (for $\Delta f=15$ KHz, and Isc>11), and each entry in the third column 515 indicates a modulation technique that may be used by a UE based on the MCS index indicated to the UE when the subcarrier allocation is greater than 11. Each entry in the fourth column 520 indicates a number of resource units ($N_{RU}$). Each entry in the fifth column 525 indicates a TBS. In one aspect, using the table 502, the UE may map the MCS index received by the UE in the RAR from the base station to determine the modulation scheme, number of resource units (RUs), and the TBS for Msg3 transmission. For example, as can be seen in the table 502, each MCS index corresponds to a modulation technique, a number of RUs and a TBS. If a UE is signaled an MCS index of "000", based on the table 502 (which may be stored in the UE and/or otherwise accessible by the UE), the UE may determine that modulation to be used for Msg3 is "pi/2 BPSK" (in case of a subcarrier allocation Isc=0, 1, 11), number of resource units ($N_{RU}$)=4, and TBS is 88 bits. As can be seen the entries corresponding to MCS index "011" through "111" in the illustrated example table 502 are indicated as reserved. The reserved indices may also be referred to herein as unassigned indexes. The reserved/unassigned fields may be customized, e.g., by different operators/service providers, for different uses and/or applications as desired.

As mentioned supra, for a variety of applications, it may be desirable to transmit application data using Msg3. However, as mentioned earlier and as can be seen from table 502, currently for Msg3 a transport block size of 88 bits is allowed in some systems, which may not be sufficient for transmission of additional data (e.g., in addition to the normal payload data of Msg3). Therefore, for transmission of additional data (e.g., when EDT is desired), an increased allocation for Msg3 may be desired, e.g., for an increased TBS so that additional amount of data may be transmitted.

One approach may include using some of the reserved/unassigned MCS index bits to add new TBS/$N_{RU}$ entries in the table 502 to define and support additional transport block sizes and number of resource units, e.g., by defining modulation scheme, TBS and $N_{RU}$, corresponding to the reserved MCS indices. However, such an approach has some limitations. For example, such an approach may not be forward compatible in the sense that the reserved values for future applications and/or use cases are exploited which reduces the possibility of future changes (e.g., because the number reserved bits and entries in the table 502 will be reduced). Another limitation is that this approach may only allow for a small set of transport block sizes to be defined, e.g., corresponding to the reserved MCS indices. Different applications may have different payload size requirements and thus a small set of predefined transport block sizes may not work well with a variety of different applications with different payload sizes. For example, if a new TBS allowing 400 bits is added, the new TBS may be utilized for transmitting application data for an application that may have a payload size of approximately 400 bits. However, another application that may have a payload size of 600 bits may not be able to use the new TBS of 400 bits.

In accordance with some aspects of the methods described herein, rather than predefining a set of new transport block sizes and using the reserved/unassigned bits by modifying the table 502, a base station (e.g., base station 404) may signal information (e.g., in a SIB) that may allow a UE (e.g., UE 402) to determine a TBS and/or number of resource units ($N_{RU}$) (e.g., for transmitting Msg3) by interpreting an allocation in the a random access response (RAR) message based on the signaled information. In one aspect, a UE may be configured to interpret an RAR grant (e.g., indicated in a RAR message from the base station to the UE) based on information, e.g., a parameter, that is signaled in a SIB as discussed in greater detail below.

Figure 6:
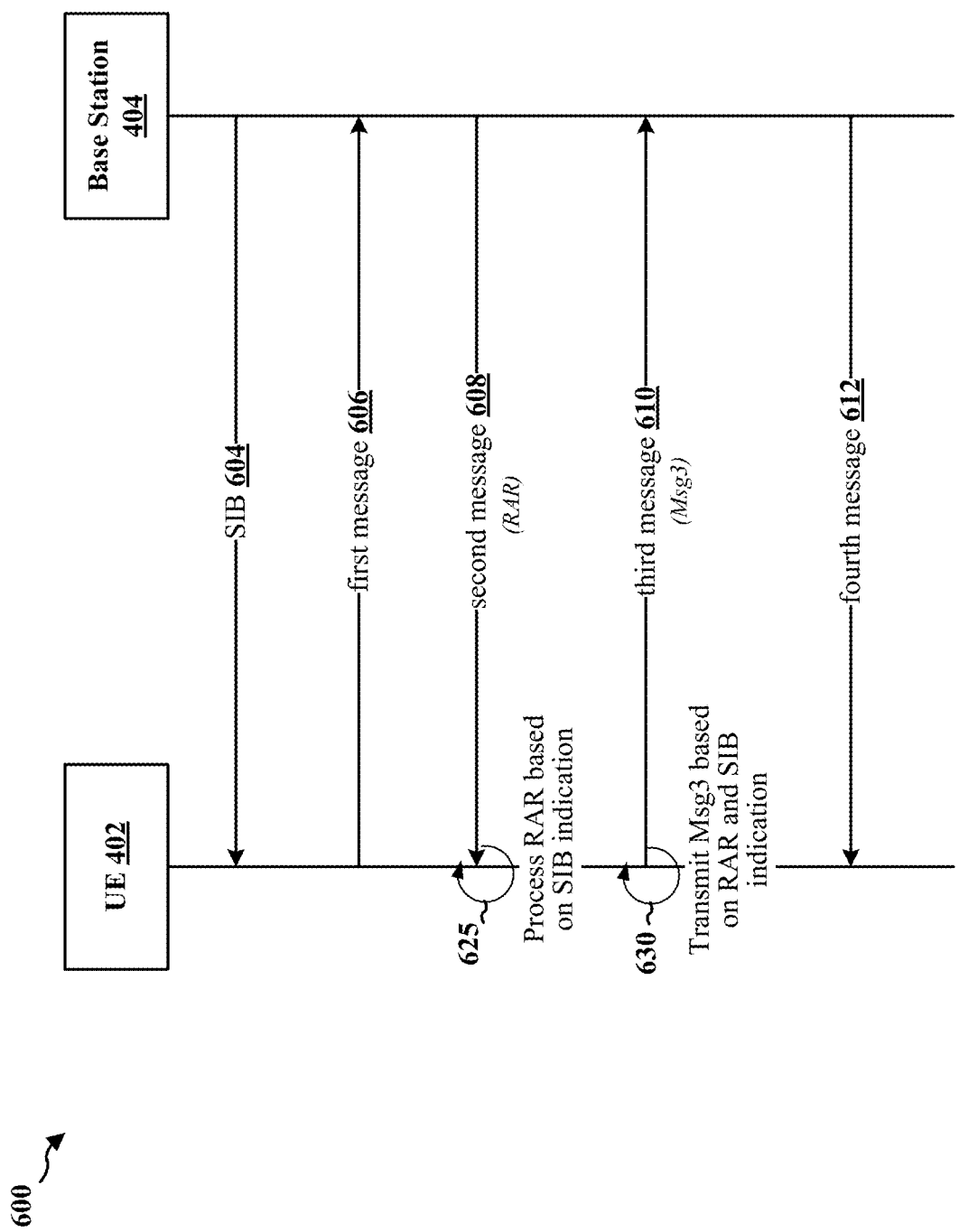
FIG. 6 is a diagram illustrating communication between a UE and a base station engaged in a random access procedure, in accordance with certain aspects described herein.

FIG. 6 is a diagram 600 illustrating an example process that supports early data transmission during the RACH procedure in accordance with certain aspects. In the example illustrated in FIG. 6 and discussed infra, the base station 404 may provide an indication to the UE 402 via a SIB 604 and the UE 402 may interpret an allocation in the an RAR message based on the indication in accordance with certain aspects of the methods described herein. As illustrated, the UE 402 may receive a SIB 604 including information (e.g., an indication) to allow the UE 402 to determine one or more parameters for early data transmission during the RACH procedure and/or allow the UE 402 to interpret an allocation in the an RAR message from the base station 404. The various types of information that may be signaled via the SIB to facilitate early data transmission is discussed infra in more detail.

Similar to the example discussed in connection with FIG. 4, the UE 402 may engage in a RACH procedure with the base station 404. However in the current example, having received the SIB 604, the UE 402 may perform the RACH procedure based at least in part on the information received in the SIB. The RACH procedure may include a message exchange between the UE 402 and the base station 404—a first message 606 (e.g., random access request or Msg1), a second message 608 (e.g., random access response or Msg2), a third message 610 (e.g., connection request or Msg3), and a fourth message (resolution/response message or Msg4) 612. The UE 402 may transmit a preamble the base station 404 in the first message 606 (e.g., NPRACH in the context of narrowband communication). In some configurations, the UE 402 may select a resource for transmitting the first message based on the information indicated in the SIB 604 as discussed infra. In response to receiving the first message 606, the base station 404 may transmit the second message 608 to the UE 402. The second message 608 may be the RAR message (Msg2). As discussed supra, the second message 608 may provide, among other things, an initial uplink resource grant and indicate an MCS index for the UE 402 to transmit the third message 610 (Msg3). In accordance with one aspect, the UE 402 may be configured to process, e.g., interpret, (at 625) the RAR based on the information received in the SIB 604. Based on the received indication in the SIB 604 and the indicated MCS index in the RAR message 608, the UE 402 may interpret the grant in the RAR message 608 and determine the modulation and coding technique, a number of resource units, and the TBS for Msg3 transmission. In some configurations, the determination may include performing a table lookup (e.g., such as the table 502 and other tables discussed below) using the received information in the SIB 604 and the MCS index from the RAR 608. In certain aspects, such table(s) may be predefined and preconfigured in the UE 402. The UE 402 may then transmit (at 630) the third message 610 (Msg3) to the base station 404, e.g., based on the understanding of the RAR 608 and the information received via the SIB 604. In various configurations, in accordance with above discussed process, the UE 402 may be able to transmit a relatively greater size payload in the third message 610 based on the RAR 608 and the information received via the SIB 604. In some configurations, after receiving the third message 610 from the UE 402, the base station 404 may transmit the fourth message 612 (e.g., contention resolution message) to the UE 402 that may confirm the grant.

In accordance with various aspects described herein, the UE 402 may interpret the RAR grant (e.g., indicated in a RAR message 608) based on information in the SIB. Depending on a given configuration, various types of information may be signaled via the SIB to facilitate early data transmission. For example, in one example configuration, the SIB 604 may include a multiplicative value for the TBS entry (e.g., in the table 502) indicating that the normal allocation of a TBS (e.g., based on MCS index in the RAR grant 608 and table 502) may be multiplied by the multiplicative value indicated in the SIB 604 to determine the new increased TBS for transmission of Msg3 610. For example, the SIB 604 may indicate a multiplicative value, e.g., ×2, indicating that the TBS based on the RAR grant should be multiplied by 2. Thus, in such an example case, based on the table 502 and the received indication, the UE 402 may determine the new TBS for early data transmission as, TBS=88×2=176 bits. The number of resource units ($N_{RU}$) may also be scaled for EDT purposes by the same value in some configurations. For example, if the SIB 604 indicates a multiplication factor of "2" and the RAR grant indicates an MCS index of "011", the UE 402 may determine that for the data transmission in Msg3 the TBS=2×88=176 bits and ($N_{RU}$)=2×4=8. For modulation (columns 510 and 515 of table 502), the UE 402 may use the modulation entries corresponding to MCS index specified in the RAR message 608, e.g., MCS index "000" in this example.

Figure 7:
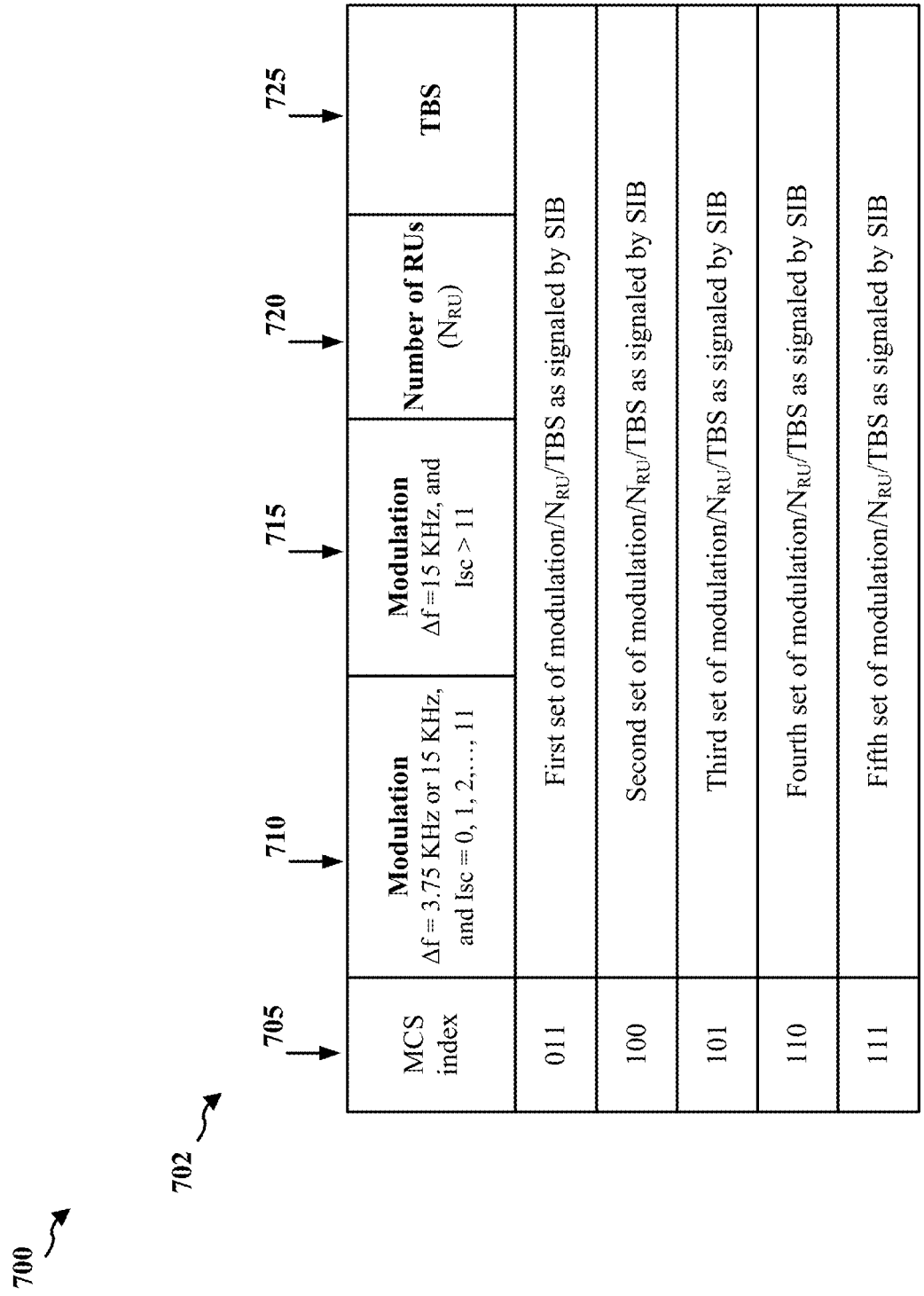
FIG. 7 illustrates another example table that may be constructed based on the information received by a UE, e.g., in a SIB, and may be used for interpreting a random access response grant for transmission of a connection request message (e.g., Msg3).

In accordance with another aspect, the SIB 604 may include a set of entries for each of the reserved/unassigned fields/values, e.g., entries corresponding to the reserved fields shown in table 502. For example, for each of the reserved MCS indices (011, 100, 101, 110, and 111), the SIB 604 may indicate a set of entries indicating modulation techniques, a set of entries/values of $N_{RU}$, and a set of entries/values of TBS. If each set of entries (for a given parameter) includes multiple entries, then multiple tables may be generated. Based on the information received in the SIB 604 (e.g., from the base station 404), another table may be constructed (e.g., by the UE 402) for use when transmitting Msg3. When the UE 402 receives the RAR grant indicating an MCS index, the UE 402 may use the MCS index to lookup the table that is generated based on the SIB 604, to determine the parameters (modulation, $N_{RU}$, and/or TBS) for transmitting Msg3. For example, FIG. 7 illustrates a diagram 700 of an example table 702 that may be constructed based on the information (e.g., regarding the entries corresponding to the unassigned fields) received in the SIB 604 in one particular configuration. As illustrated in table 702, the entries corresponding to modulation, $N_{RU}$, and TBS fields (in respective columns 710, 715, 720, and 725) for the MCS indices "011", "100", "101", '110", and "111" (in column 705) may be populated based on the information indicated in the SIB from the base station 404. For example, the SIB 604 may indicate a first set of modulation, $N_{RU}$, and TBS for MCS index 011, a second set of modulation, $N_{RU}$, and TBS for MCS index 100, a third set of modulation, $N_{RU}$, and TBS for MCS index 101, a fourth set of modulation, $N_{RU}$, and TBS for MCS index 110, and a fifth set of modulation, $N_{RU}$, and TBS for MCS index 111. As the SIB 604 may include a set of entries for each of the reserved/unassigned fields/values, multiple such tables may be generated based on the information in the SIB 604, with each table including one entry for each of the reserved fields corresponding to each of the parameters shown in the example table 702.

Based on a received MCS index in the RAR grant, the UE 402 may look up the corresponding entries (e.g., in a row corresponding to the MCS index in table 702) in the table 702 to determine the parameters (e.g., TBS, number of resources, and/or other parameters) for transmitting Msg3. While the example table 702 is illustrated to include information corresponding to 5 MCS indices for simplicity, a table with different number of entries (e.g., 32, 64, etc.) may be generated in some other examples.

In another example aspect, the SIB 604 may include an indication of at least one parameter for Msg3 transmission. In such an aspect, another table (e.g., other than the table 502) that may specify the number of RUs ($N_{RU}$) for the reserved MCS indices "011" "100", "101", '110", and "111" may be used, while the TBS for each case (e.g., each of the MCS indices) may be signaled by the base station via the SIB 604. In some configurations, the table may just specify the number of resource units ($N_{RU}$) for each of the reserved MCS indices "011" through "111". Such a table specifying the number of RUs may be preconfigured or may be provided to the UE 402 by the base station 404. For example, such a table may comprise a first column (such as column 505) indicating the MCS indices and a second column (such as column 520) including the number of RUs ($N_{RU}$) values corresponding to each of the MCS indices. Again, for MCS indices "011" through "111", the UE 402 may determine the parameters for transmitting Msg3 based on the table (e.g., use the table to determine $N_{RU}$ corresponding to an MCS index indicated in the RAR 608) and based on the SIB (e.g., use the TBS indicated in the SIB 604 corresponding to an indicated MCS index). For example, in one configuration, the SIB 604 may explicitly indicate TBS values for one or more of the reserved MCS indices. Then for a given MCS index indicated in the RAR message 608, the UE 402 may determine the $N_{RU}$ value from the predefined table, and use the TBS explicitly indicated in the SIB 604 for transmitting the connection request message (e.g., Msg3) 610.

In accordance with one aspect, there may be multiple predefined EDT resources associated with different corresponding transport block sizes. For example, in one configuration there may be a first NPRACH resource associated with a first TBS configuration (e.g., TBS of 400 bits) and a second NPRACH resource associated with a second TBS configuration (e.g., TBS of 600 bits). In such a configuration, the base station 404 may signal the NPRACH resources associated with different TBS configurations in the SIB 604. The maximum TBS (that may be used for subsequent transmission of Msg3) for the various different TBS configurations associated with each of the NPRACH resources may also be indicated in the SIB in some configurations. While a NPRACH resource may be used for random access request (Msg1) transmission, the associated TBS may be applicable to the connection request (Msg3) transmission. Based on the knowledge of a payload size at the UE (e.g., payload that UE 402 has to transmit in Msg3), the UE 402 may select a resource (e.g., one of the first NPRACH resource or the second NPRACH resource in the above example) for transmission of the first message (e.g., Msg1). The UE 402 may then transmit the first message (NPRACH) 606 of the RACH procedure to the base station 402 using the selected NPRACH resource, and receive the RAR (grant) message 608 in response. In such an example case, the UE 402 may be configured to interpret the RAR grant based on the (NPRACH) resource used for transmitting the first message. In other words, in some configurations, the interpretation of the RAR grant may depend on whether the UE transmitted first message (Msg1) was on the first resource or the second resource. For example, in one configuration, the UE 402 may receive the SIB 604 indicating a plurality of resources for transmitting the first message with each resource being associated with a different TBS configuration (that may also indicated in the SIB). The UE 402 may select a NPRACH resource based on the SIB 604 and its knowledge of a payload size to transmit (e.g., number of bits to transmit in Msg3), and transmit the first message 606 using the selected NPRACH resource. The UE 402 may receive the RAR grant 608 in response to the first message, and interpret the RAR grant based on the SIB 604 and selected NPRACH resource.

For example, there may be a correspondence/association between NPRACH resources (for Msg1 transmission) and transport block sizes (for subsequent Msg3 transmission). If the UE 402 has a relatively large payload to transmit in Msg3, the UE 402 may select an NPRACH resource that may be associated with a larger TBS (as indicated in the SIB 604) and vice versa. Furthermore, in such configurations, the UE 402 may interpret the received grant in the RAR 608 based on the knowledge of its earlier transmission of the first message on the selected NPRACH resource. In some such cases, while the UE 402 may rely on a table (e.g., such as table 502/602) to determine one or more parameters (e.g., the number of resource units and modulation) for transmission of the connection request message (Msg3) 610, the UE 402 may assume the maximum TBS associated with the selected NPRACH resource as indicated in the SIB as the applicable TBS for transmission of Msg3 610, and not necessarily rely on the TBS specified in the table.

The various example tables discussed above may be different and/or may have different values for some parameters for different coverage enhancement (CE) levels. For example, for two different CE levels the corresponding tables may have a same TBS, but different $N_{RU}$s to accommodate different transmission times. In another example, not just large but small transport block sizes (e.g., less than 88 bits) may also be supported in some tables. In some examples, the signaling of parameters can be the same for all CE levels (e.g., in SIB) or different for different CE levels. Thus, the above discussed methods may be used with different CE modes. Many variations are possible and may be used in different configurations.

In some systems, a Msg3 grant for eMTC may utilize the legacy TBS table, with some changes. However, it may be desirable for the grant for Msg3 be increased to accommodate for, e.g., up to 1000 bits. In this regard, a few options are provided herein. For CE Mode A (e.g., moderate coverage enhancement), one option is to modify the entries/interpretation of the RAR grant in a fixed manner, e.g., by modifying the entries of the preconfigured table (e.g., such as table 502), e.g., in a fixed manner that may have agreed upon between the UE and the base station. Another option is to use a similar approach as with NB-IoT devices discussed above where the interpretation of the RAR grant for Msg3 may depend on information provided in the SIB.

Various aspects related to rate matching for Msg3 in eMTC are described. The basic function of rate matching is to match a number of bits in a transport block (TB) to the number of bits that can be transmitted in a given allocation. Rate matching involves many things including sub-block interleaving, bit collection and bit selection. Rate matching may provide different subsets of a code block for different transmissions of a packet, e.g., using the concept of Redundancy Version (RV). In the case of a first transmission of each coded block (RV=0), a small amount of systematic bits may be punctured. That is, instead of reading out data from the beginning of systematic bit stream, the output of a circular buffer starts from a specified point which may be configured according to a specified RV.

It is observed that one of the challenges with eMTC is that the rate matching is fixed to 4 RVs (like in legacy LTE). However, encoding may be extended across subframes in order to improve the ability to transmit EDT in eMTC and/or NB-IoT. For CE Mode B, the typical allocation is 1 PRB (e.g., the UE is power limited, this way there is less resource wastage). With 4 RVs, the number of total coded bits that can be transmitted may be 12×12 (12 subcarriers×12 symbols)×2 (QPSK)×4 (Number of RVs)=1152 channel bits. After this, the same RVs will be repeated, so there may be an SNR gain (e.g., chase combining may result in SNR gain due to combining of same bits) but no coding gain (incremental redundancy).

In accordance with one aspect of the proposed methods, for Msg3 transmission, the encoding/rate matching/number of RVs may be changed. Such a modified rate matching may be implemented in a variety of ways. In a first example configuration, for Msg3, the rate matching may be performed across more than 1 subframe (e.g., cross-subframe rate matching). This approach is different than the rate matching approach in legacy LTE systems. For example as opposed to restarting the RV/increasing the RV at the beginning of every subframe, the UE may restart the RV/increase the RV every N subframes.

Figure 8:
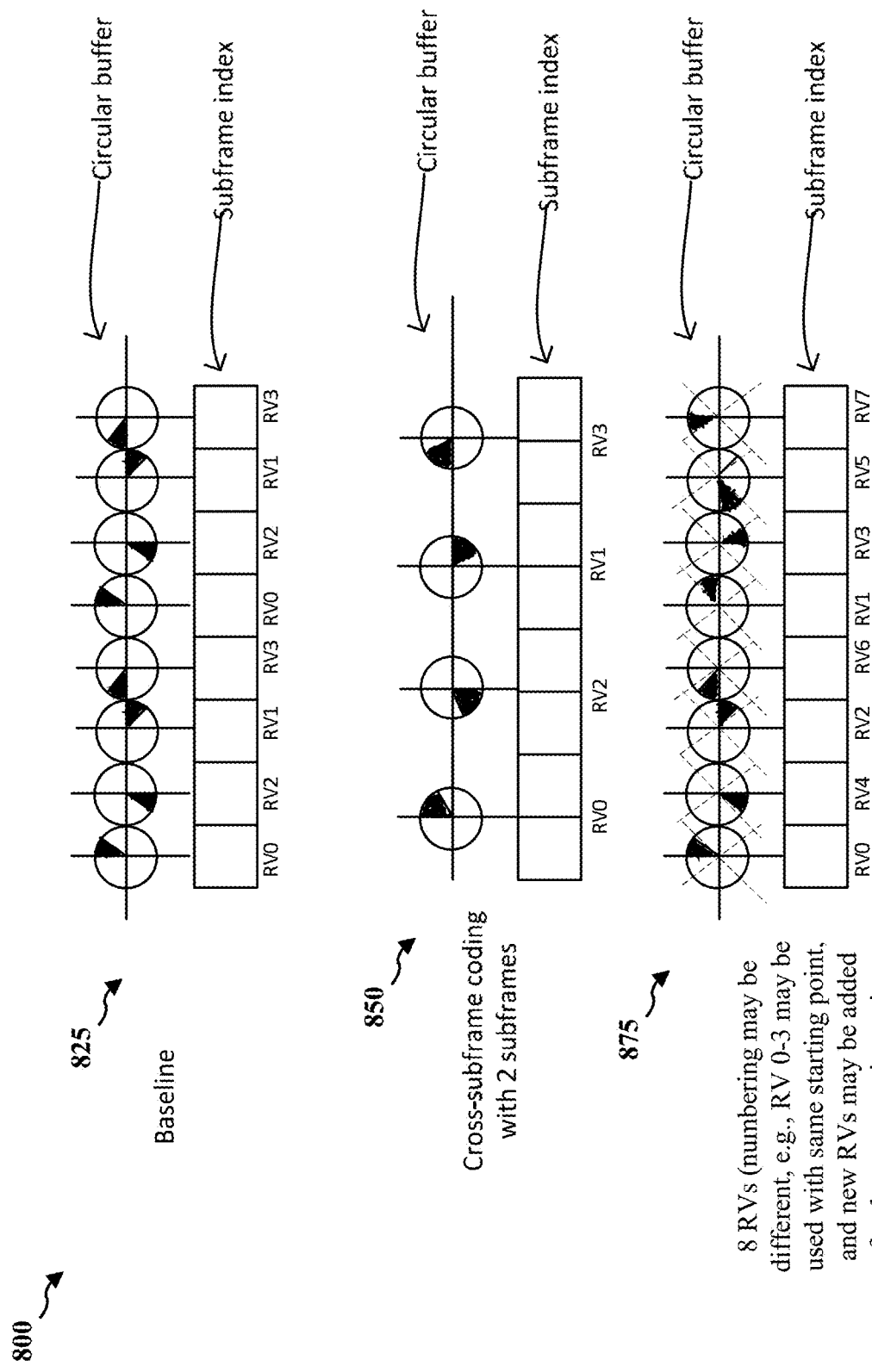
FIG. 8 illustrates a diagram depicting pictorial illustrations of various example rate matching techniques, in accordance with certain aspects.

FIG. 8 illustrates a diagram 800 depicting pictorial illustrations of various example rate matching techniques. A graphical/pictorial illustration of the cross-subframe coding/rate matching operation is shown in drawing 850 of FIG. 8 relative to a baseline rate matching example shown in drawing 825. In an aspect, the cross-subframe rate matching (e.g., the number of subframes over which we rate match) can be based on the number of repetitions and/or TBS size and/or modulation scheme for Msg3 transmission.

In a second example configuration, for Msg3, the number of redundancy versions may be increased (e.g., up to 8 RVs) compared to other transmissions from the UE. For example, the RV cycling can be as follows: RV0, RV4, RV2, RV6, RV1, RV3, RV5, RV7 (or another order that may predefined). A graphical/pictorial illustration of the modified rate matching with an increased redundancy versions is shown in drawing 875 of FIG. 8. In some cases, the interleaving may be changed when 8 redundancy versions are used. For example, the interleaving can be performed per subframe, instead of over the whole set of rate matched bits, thus leading to a resource mapping in the order of first over symbol index, then over subcarrier index, and finally over subframe index, instead of the legacy interleaving that would have led to time first (across multiple subframes), frequency second.

Figure 9:
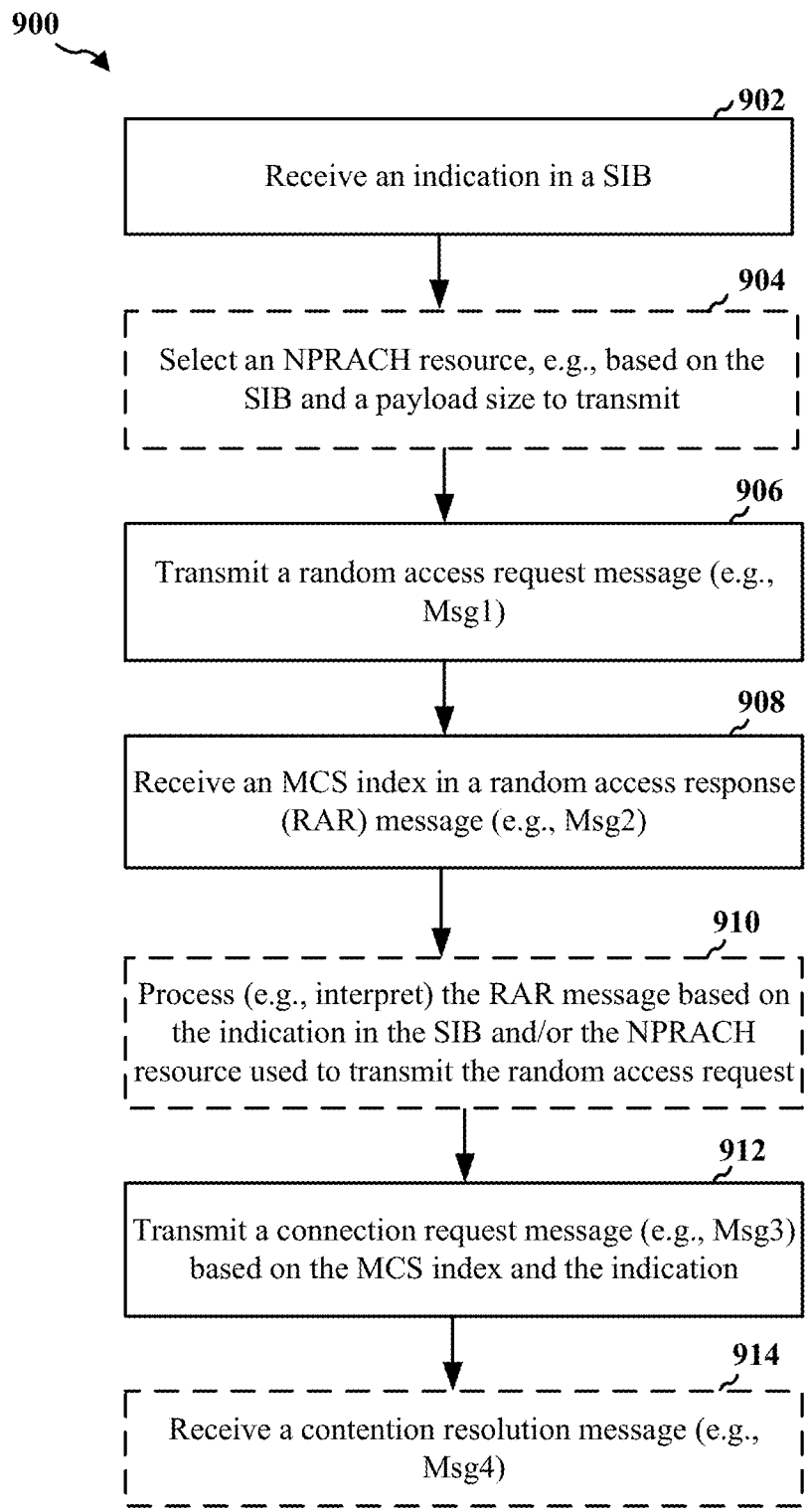
FIG. 9 is a flowchart of an example method of wireless communication.

FIG. 9 is a flowchart 900 of a method of wireless communication. The method may be performed by a UE (e.g., the UE 104, 350, 402). The UE may comprise a UE performing NB-IoT wireless communication or eMTC wireless communication. Optional aspects are illustrated with a dashed line.

At 902, the UE may receive an indication for at least one parameter for a random access response grant in a SIB from a base station. For example, with reference to FIG. 6, the UE 402 may receive an indication in the SIB 604. As discussed supra, the SIB 604 may include various different types of information/indication in different configurations. For example, as discussed above, in one configuration, the SIB 604 may include an explicit indication of the TBS for Msg3 transmission. For example, the indication may comprise a parameter, such as a TBS, corresponding to an unassigned MCS index. In another example, the SIB 604 the indication in the SIB may comprise one or more table entries for an unassigned MCS index (e.g., entries for one or more parameters corresponding to unassigned indices 011, 100, 101, 110, 111 etc.). In some configurations, the SIB 604 may include a set of entries for each of the reserved/unassigned fields for parameters corresponding to the unassigned MCS indices such as those shown in the example table 502. In yet another example, the indication in the SIB 604 may comprise a plurality of NPRACH resources for transmitting the first message (also referred to as random access request or Msg1), with each resource being associated with a different TBS configuration for Msg3 transmission. The TBS configuration may also indicated in the SIB as discussed supra.

In various configurations, based on the indication (which may take various forms as discussed above) in the SIB, the UE may decide how to proceed with a RACH procedure and perform early data transmission.

In one configuration where the SIB may indicate NPRACH resources for transmitting a first RACH message (Msg1) and corresponding/associated maximum transport block sizes for Msg3 transmission, at 904 the UE may select a NPRACH resource (from the NPRACH resources indicated in the SIB) for transmitting the first message based on the indication in the SIB and the knowledge of a payload size at the UE (to transmit in Msg3). In some other configurations, the operation illustrated at block 904 may be skipped and the processing may proceed to 906 from 902.

At 906, the UE may transmit a random access request (e.g., Msg1) to the base station. The random access request may comprise a Msg1, as described in connection with FIGS. 4 and 6. For example, with reference to FIG. 6, the UE 402 may transmit the random access request (Msg1) 606 to the base station 404. In one configuration, where the NPRACH resource selection may be performed based on the indication in the received SIB (as discussed at 904), the UE may transmit the random access request on the selected NPRACH resource.

At 908, the UE may receive an MCS index in a random access response (RAR) from the base station, e.g., in a Msg2, as described in connection with FIGS. 4 and 6. For example, with reference to FIG. 6, in response to the random access request (Msg1) 606 transmitted to the base station 404, the UE 402 may receive the RAR 608 (also referred to as the second message or Msg2). As discussed in more detail supra, the random access response may provide the UE 402 with a grant for an RRC connection request message, e.g., Msg3.

As illustrated at 910, the UE may process (e.g., interpret/analyze) the random access response from the base station based on the indication received in the SIB and/or the NPRACH resource used for transmission of the random access request (at 904). For example, in accordance with one aspect, the UE 402 may be configured to interpret the grant in the RAR 608 for the transmission of Msg3 based on the information received in the SIB 604. For example, if TBS (e.g., corresponding to one or more MCS indices) are indicated in the SIB 604, the UE 402 may interpret/determine that the received RAR 608 is to be relied upon for the MCS index for Msg3 transmission, but the UE 402 is to use a TBS value (e.g., indicating a maximum number of bits for Msg3 payload) indicated in the SIB corresponding to the MCS index in the RAR 608. In some configurations, one or more other parameters values (e.g., for modulation, number of resource units, etc.) for Msg3 transmission may be determined by accessing a table (such as tables 502 and/or 702) with entries corresponding to the MCS index in the received RAR, or they may be signaled to the UE 402 by the base station 404.

In some configurations, where the UE may transmit the first message (Msg1) on a NPRACH resource selected from the NPRACH resources indicated in the SIB, the UE 402 may be configured to interpret the RAR grant based on the NPRACH resource used for transmitting the first message. For example, the interpretation of the RAR grant may depend on which NPRACH resource (out of the indicated resources in the SIB) the connection request message (Msg1) was transmitted because of the association of different TBS with different resources signaled in the SIB.

At 912, the UE may transmit a connection request message to the base station based on the MCS index and based on the indication received in the SIB. The connection request message may comprise an RRC connection request, e.g., Msg3. The transmission of the connection request message may be based on the interpretation of the received RAR in accordance with the received indication in the SIB. For example, with reference to FIG. 6, the UE 402 may transmit the connection request message (Msg3) 610 based on the received RAR (indicating the MCS index) and the SIB which may provide indication of one or more parameter values (e.g., such as TBS) that may be used for early data transmission in Msg3 and/or information that may allow the UE 402 to determine the parameters values based on the combination of the SIB, MCS index in the received RAR and one or more predefined tables. For example, the indication received in the SIB (at 902) may comprise a TBS value (e.g., 600 bits) corresponding to an unassigned MCS index (e.g., 011), and the received MCS index (in the RAR message) may comprise the unassigned MCS index 011. In such an example, the UE 402 may transmit the connection request message based on a predefined number of resource units (e.g., indicated in a predefined table) and the TBS value received in the SIB. The table may specify the number of RUs, while the SIB may indicate the corresponding TBS. For example, the UE 402 may access a table indicating a predefined number of resource units corresponding to the unassigned MCS indices to determine the number of resource units for MCS=011 indicated in the received RAR message, and determine that the TBS for Msg3 transmission is 600 bits based on the indication in the SIB. Accordingly, in such an example, the UE 402 may transmit the connection request message based on the indicated TBS (e.g., maximum payload size of 600 bits) and the predefined number of resource units (e.g., determined based on the predefined table using the MCS index received in the RAR message).

In some configurations, at 914, the UE 402 may receive a fourth message (e.g., contention resolution message) from the base station 404 in response to the connection request message (Msg3). In some configurations, Msg4 may terminate/complete the random access procedure and may include a contention resolution identifier.

As discussed elsewhere supra, in various different configurations, the indication received via the SIB from the base station 404 may comprise different types of information that may enable early data transmission and allow the UE 402 to transmit desired payload (e.g., higher or lower than a normal allowed payload size of Msg3). In one example, the indication received in the SIB at 902 may comprise a scaling value. In this example, the connection request message (at 912) may be transmitted based on a number of resource units ($N_{RU}$s) corresponding to the MCS index that has been scaled by the scaling value received in the SIB. For example, the SIB may indicate a multiplicative value of 2, and the UE may scale the number of resource units for the connection request message by multiplying the number of resource units corresponding to the MCS index (e.g., indicated in a table such as table 502) by 2.

In some examples, the indication received in the SIB at 804 may comprise a scaling value, and the connection request message may be transmitted (at 912) based on a TBS (corresponding to the MCS index indicated in the RAR) that has been scaled by the scaling value received in the SIB.

In another example, the indication received in the SIB at 804 may comprise one or more parameters (e.g., a value corresponding to a parameter for a table entry) for an unassigned MCS index, and the received MCS index in the RAR message may comprise the unassigned MCS index. In this example, the UE may transmit the connection request message (at 912) based on the parameters received in the SIB corresponding to the unassigned MCS index. For example, the table entry for an unassigned MCS index may comprise a value for at least one of the parameters shown in table 502 such as the number of resource units, TBS, etc. In some configurations, the SIB may include a set of entries for more than one unassigned MCS index, e.g., for each of the reserved MCS indices 011, 100, 101, 110, 111.

In a fourth example, the indication received in the SIB at 804 may comprise a TBS value corresponding to an unassigned MCS index, and the received MCS index may comprise the unassigned MCS index. In this example, the UE may transmit the connection request message based on a predefined number of resource units and the TBS value received in the SIB. Thus, the table may specify the number of RUs, while the SIB signals the corresponding TBS.

In some configurations, the parameter(s) indicated in the SIB may comprise different parameters for different supported coverage levels.

Figure 10:
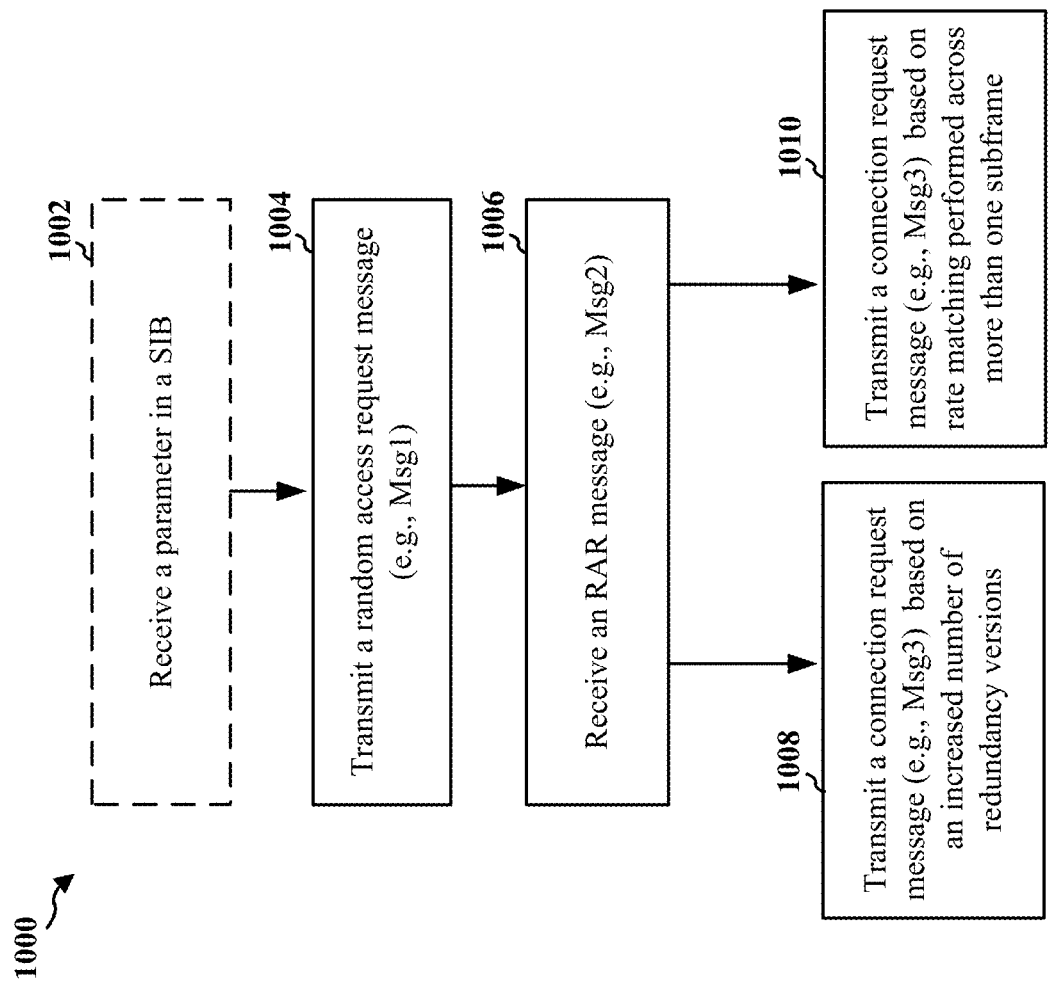
FIG. 10 is a flowchart of another example method of wireless communication.

FIG. 10 is a flowchart 1000 of a method of wireless communication. The method may be performed by a UE (e.g., the UE 104, 350, 402). The UE may comprise a UE performing eMTC. Optional aspects are illustrated with a dashed line.

At 1004, the UE transmits a random access request, e.g., a Msg1, to a base station.

At 1006, the UE receives a random access response, e.g., a Msg2, from the base station.

The UE may then transmit a connection request message to the base station based on at least one of an increased number of redundancy version than a redundancy version for other transmissions from the user equipment or rate matching performed across more than one subframe.

For example, at 1008, the UE may transmit the connection request message to the base station based on an increased number of redundancy version than a redundancy version for other transmissions. The increased number may be, e.g., more than four redundancy versions. The increased number of redundancy versions may be eight RVs, as described in connection with FIG. 8. The increased number of redundancy versions may be based on any of a number of repetitions for the connection request message, a transport block size for the connection request message, or a modulation scheme for transmission of the connection request message.

As illustrated at 1010, the connection request message may be transmitted to the base station based on rate matching performed across more than one subframe, e.g., as described in connection with FIG. 8.

The number of subframes over which rate matching is performed may be based on any of a number of repetitions for the connection request message, a transport block size for the connection request message, or a modulation scheme for transmission of the connection request message.

The increased number of redundancy version or the rate matching performed across more than one subframe is based on a parameter received in a System Information Block. Thus, at 1002, the UE may receive information in a SIB that the UE may use to apply an increased number of RVs or adjust the rate matching for the connection request message.

Figure 11:
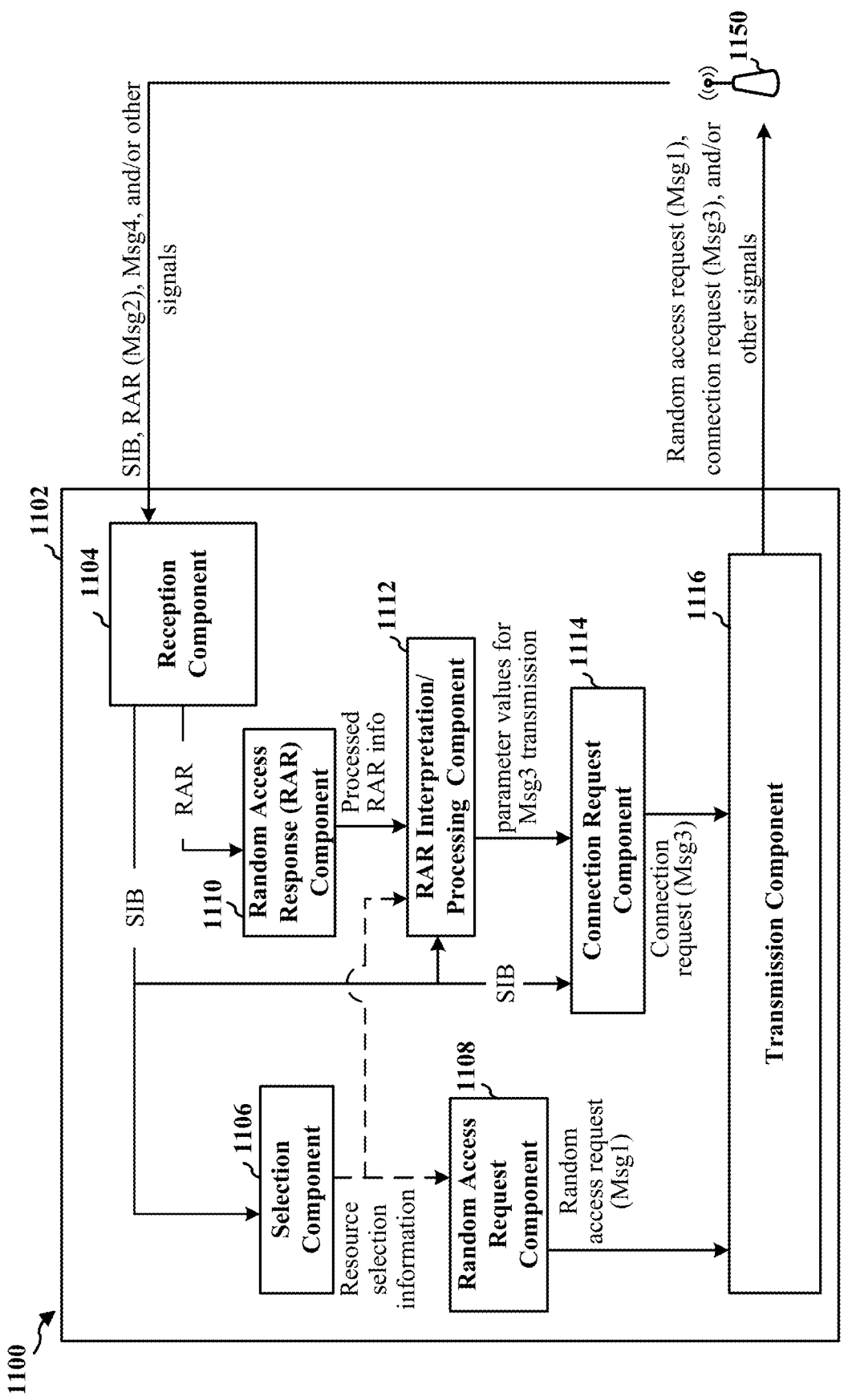
FIG. 11 is a conceptual data flow diagram illustrating the data flow between different means/components in an example apparatus, e.g., a UE.

FIG. 11 is a conceptual data flow diagram 1100 illustrating the data flow between different means/components in an example apparatus 1102. The apparatus 1102 may be a UE (e.g., such as UE 104, 350, 950). The apparatus 1102 may include a reception component 1104, a selection component 1106, a random access request component 1108, a random access response component 1110, a random access response interpretation/processing component 1112, a connection request component 1114, and a transmission component 1116.

The reception component 1104 may be configured to receive signals and/or other information from other devices including, e.g., base station 1150. The signals/information received by the reception component 1104 may be provided to one or more components of the apparatus 1102 for further processing and use in performing various operations in accordance with the methods discussed supra including the methods of flowcharts 900 and 1000. Thus, via the reception component 1104, the apparatus 1102 and/or one or more component therein receive signals and/or other information (e.g., such as a SIB, RAR (Msg2), Msg4, data and/or other signals) from external devices such as the base station 1150. In one configuration, the reception component 1104 may be configured to receive a SIB including an indication of at least one parameter from the base station as discussed supra in connection with FIGS. 5-10. In some configurations, the indication may comprise one or more parameters (e.g., a value corresponding to a parameter for a table entry) for an unassigned MCS index. In some configurations, the indication may comprise a TBS value corresponding to an unassigned MCS index. In some configurations, the indication may comprise a first indication of a first set of PRACH resources associated with a first TBS and a second indication of a second set of PRACH resources associated with a second TBS. In some configurations, the first TBS and the second TBS may respectively correspond to maximum payload sizes for a connection request (Msg3). The indication received in the SIB may also comprise different types of information as discussed supra in connection with FIGS. 5-10. The information/indication received in the SIB may be provided to one or more other components of the apparatus 1102.

The selection component 1106 may be configured to select a PRACH resource for transmission of a random access request. In one configuration, the selection component 1106 may be configured to select the PRACH resource, from one of the first set of PRACH resources or the second set of PRACH resources indicated in the received SIB, based on a payload size to be transmitted at the apparatus 1102. In such a configuration, the information regarding the selected resource may be provided to the random access request component 1108.

The random access request component 1108 may be configured to generate and transmit (e.g., via the transmission component 1116) the random access request to the base station 1150. In some configurations, the random access request may be transmitted using the PRACH resource selected based PRACH resources indicated in the SIB and a payload size to be transmitted (e.g., in Msg3). In some other configurations, the random access request may be transmitted using a randomly selected PRACH resource from PRACH resources known to the apparatus 1102.

The random access response component 1110 may be configured to receive (e.g., via the reception component 1104) and process a random access response (Msg2) comprising an MCS index from the base station 1150 (e.g., in response to the transmitted random access request). The random access response may comprise a grant for transmission of the connection request to the base station 1150. In some configurations, the processed (e.g., decoded) random access response may be provided to the RAR interpretation component 1112.

The RAR interpretation/processing component 1112 may be configured to interpret the random access response from the base station based on the indication received in the SIB, as discussed supra. For example, interpreting the RAR based on the SIB may include analyzing the information in the RAR grant in view of the indication in the received SIB, e.g., in order to determine one or more parameters for transmission of the connection request (Msg3) in accordance with the methods described herein. For example, in accordance with one aspect, if TBS (e.g., corresponding to one or more MCS indices) are indicated in the SIB 604, the RAR interpretation component 1112 may interpret/determine that the received RAR 608 is to be relied upon for the MCS index for Msg3 transmission, but the UE 402 is to use a TBS value (e.g., indicating a maximum number of bits for Msg3 payload) indicated in the SIB corresponding to the MCS index in the RAR 608. In some configurations, one or more other parameters values (e.g., number of resource units) for Msg3 transmission may be determined by accessing a predefined table with entries/values for the one or more parameters corresponding to various MCS indices (e.g., including unassigned MCS indices). In another example, the indication received in the SIB may comprise a scaling (e.g., a multiplier) value. In this example, the RAR interpretation component 1112 may again interpret the RAR (Msg2) in view of the SIB indication to determine that a number of resource units ($N_{RU}$s) corresponding to the MCS index indicated in the RAR is to be scaled by the scaling value received in the SIB. The $N_{RU}$s to be used for the transmission of the connection request (Msg3) may be determined from a predefined table (such as table 502, 702 or another such table including $N_{RU}$s values for various possible MCS indices) based on the MCS index in the received RAR. In one configuration, the RAR interpretation component 1112 may be configured to interpret the random access response from the base station 1150 further based on the PRACH resource used to transmit the random access request. For example, in such a configuration, the RAR interpretation component 1112 may determine (as part of interpreting the RAR) that a TBS to be used for transmission of the connection request (Msg3) is the TBS associated with the PRACH resource (as indicated in the received SIB) used for transmitting the random access request. Thus, in various configurations, the RAR interpretation component 1112 may interpret the received RAR in accordance with the information in the received SIB for transmission of the connection request.

In some configurations, the connection request component 1114 may be configured to generate and transmit (e.g., via the transmission component 1116) the connection request (Msg3) to the base station 1150 in accordance with the methods described herein supra. In various configurations, the connection request component 1114 may be configured to transmit (via the transmission component 1116) the connection request to the base station 1150 based on the MCS index (received in the RAR) and the indication (received in the SIB). In one example, the indication in the SIB may comprise a table entry/parameter value for a parameter (e.g., TBS, $N_{RU}$, modulation, etc.) corresponding an unassigned/reserved MCS index, and the MCS index received in the random access response may comprise the unassigned MCS index. In such an example, the connection request message may be transmitted via the transmission component 1116) based on the table entry/parameter value (corresponding to the unassigned MCS index in the RAR) received in the SIB. In another example configuration, the indication in the SIB may comprise a TBS value corresponding to an unassigned MCS index, and the MCS index received in the random access response may comprise the unassigned MCS index. In such an example, the connection request message may be transmitted based on a predefined number of resource units and the TBS value received in the SIB. In another example, the indication may comprise a scaling value (e.g., a multiplier), and the connection request message may be transmitted (via the transmission component 1116) based on a number of resource units and/or a TBS value, corresponding to the MCS index indicated in the RAR, scaled by the scaling value received in the SIB as discussed in more detail supra.

In certain configurations, the connection request component 1114 may be configured to transmit (e.g., via the transmission component 1116) the connection request message to the base station 1150 based on at least one of an increased number of redundancy version than a redundancy version for other transmissions from the apparatus 1102. In one example, the increased number of redundancy versions may be eight. In one such configuration, the connection request message may be transmitted to the base station 1150 based on more than four redundancy versions. In one example, the increased number of redundancy versions may be based on at least one of a number of repetitions for the connection request message, a transport block size for the connection request message, or a modulation scheme for transmission of the connection request message. In certain other configurations, the connection request component 1114 may be configured to transmit (e.g., via the transmission component 1116) the connection request message to the base station 1150 based on rate matching performed across more than one subframe. In one such configuration, the number of subframes over which rate matching is performed may be based on at least one of a number of repetitions for the connection request message, a transport block size for the connection request message, or a modulation scheme for transmission of the connection request message. In some configurations, the increased number of redundancy version or the rate matching performed across more than one subframe may be based on a parameter received in the SIB.

The transmission component 1116 may be configured to transmit various messages to one or more external devices, e.g., including the base station 1150, in accordance with the methods disclosed herein. The messages/signals to be transmitted may be generated by one or more other components as discussed above, or the messages/signals to be transmitted may be generated by the transmission component 1116 under the direction/control of the one or more other components (e.g., such as components 1108 and/or 1114). Thus, in various configurations, via the transmission component 1116, the apparatus 1102 and/or one or more component therein transmit signals and/or other information (e.g., such as the random access request (Msg1), connection request (Msg3), control messages and/or other signals) to external devices such as the base station 1150.

The apparatus 1102 may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
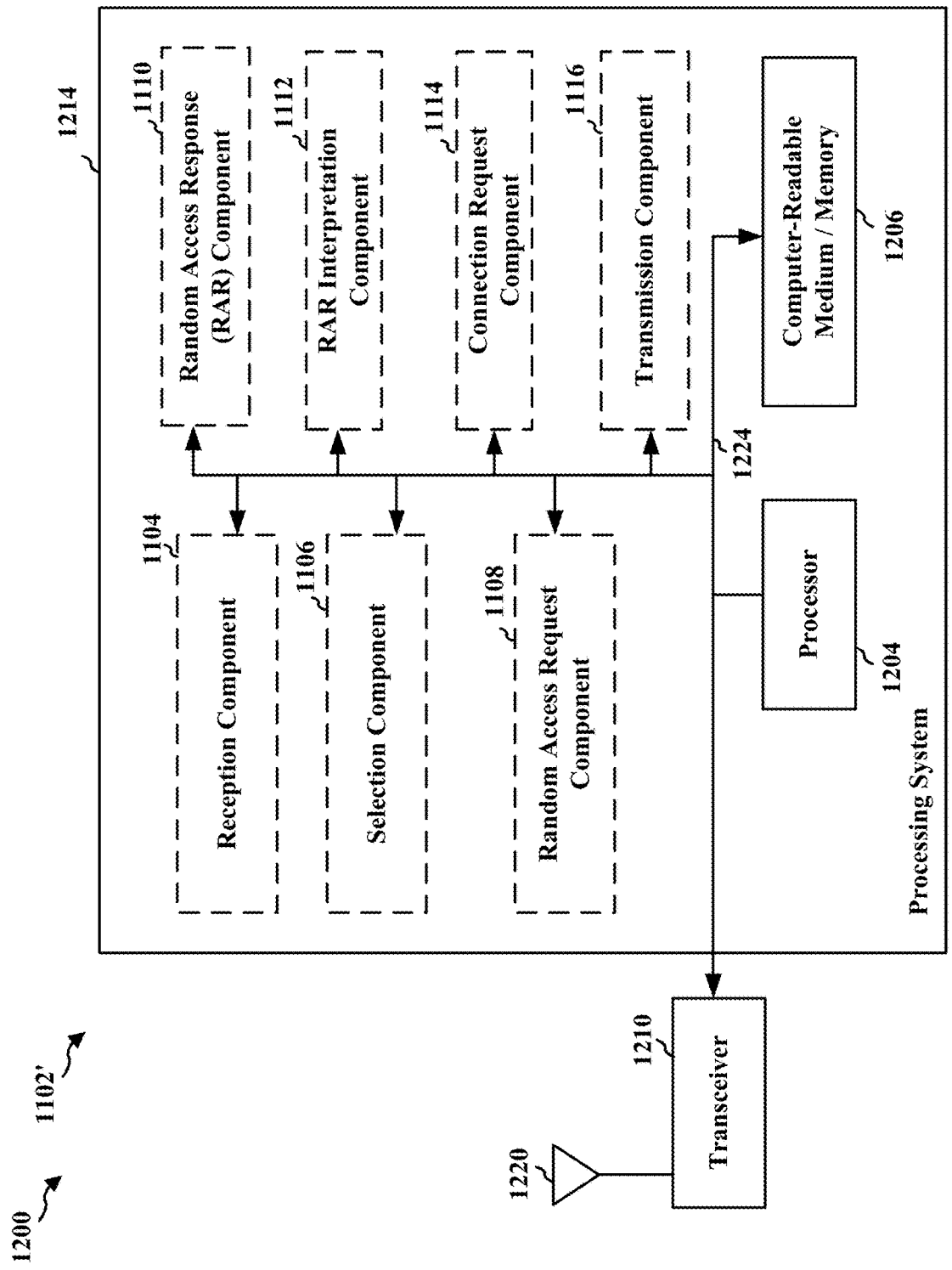
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1116, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116. The components may be software components running in the processor 1204, resident/stored in the computer-readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' (e.g., a UE) for wireless communication includes means for performing the aspects described in connection with FIGS. 9 and 10 For example, in one configuration, the apparatus 1102/1102' may comprise means for receiving an indication of at least one parameter in a SIB from a base station. In one configuration, the apparatus 1102/1102' may further comprise means for transmitting a random access request to the base station. In one configuration, the apparatus 1102/1102' may further include means for receiving an MCS index in a random access response from the base station. In one configuration, the apparatus 1102/1102' may further include means for transmitting a connection request message to the base station based on the MCS index and the indication. In some configurations, the at least one parameter comprises different parameters for different supported coverage levels.

In one configuration, the apparatus 1102/1102' may further comprise means for processing/interpreting the random access response from the base station based on the indication received in the SIB. In one configuration, the indication may comprise a table entry (e.g., RAR parameter values) for an unassigned MCS index, and the MCS index received in the random access response may correspond to the unassigned MCS index. In one such configuration, the means for transmitting the connection request message may be further configured to transmit the connection request message based on the RAR parameters received in the SIB. In one configuration, the indication may comprise a TBS value corresponding to an unassigned MCS index, and the MCS index received in the random access response comprises the unassigned MCS index. In such a configuration, the means for transmitting the connection request message may be further configured to transmit the connection request message based on a predefined number of resource units (e.g., indicated in a predefined table) and the TBS value received in the SIB.

In one configuration, the indication may comprise a first indication of a first set of PRACH resources associated with a first TBS and a second indication of a second set of PRACH resources associated with a second TBS. In one such configuration, the apparatus 1102/1102' may further comprise means for selecting a PRACH resource, from one of the first set of PRACH resources or the second set of PRACH resources, based on a payload size at the UE. In such a configuration, the means for transmitting the random access request may be further configured to transmit the random access request using the selected PRACH resource. In one such configuration, the apparatus 1102/1102' may further comprise means for interpreting the random access response from the base station based on the PRACH resource used to transmit the random access request.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
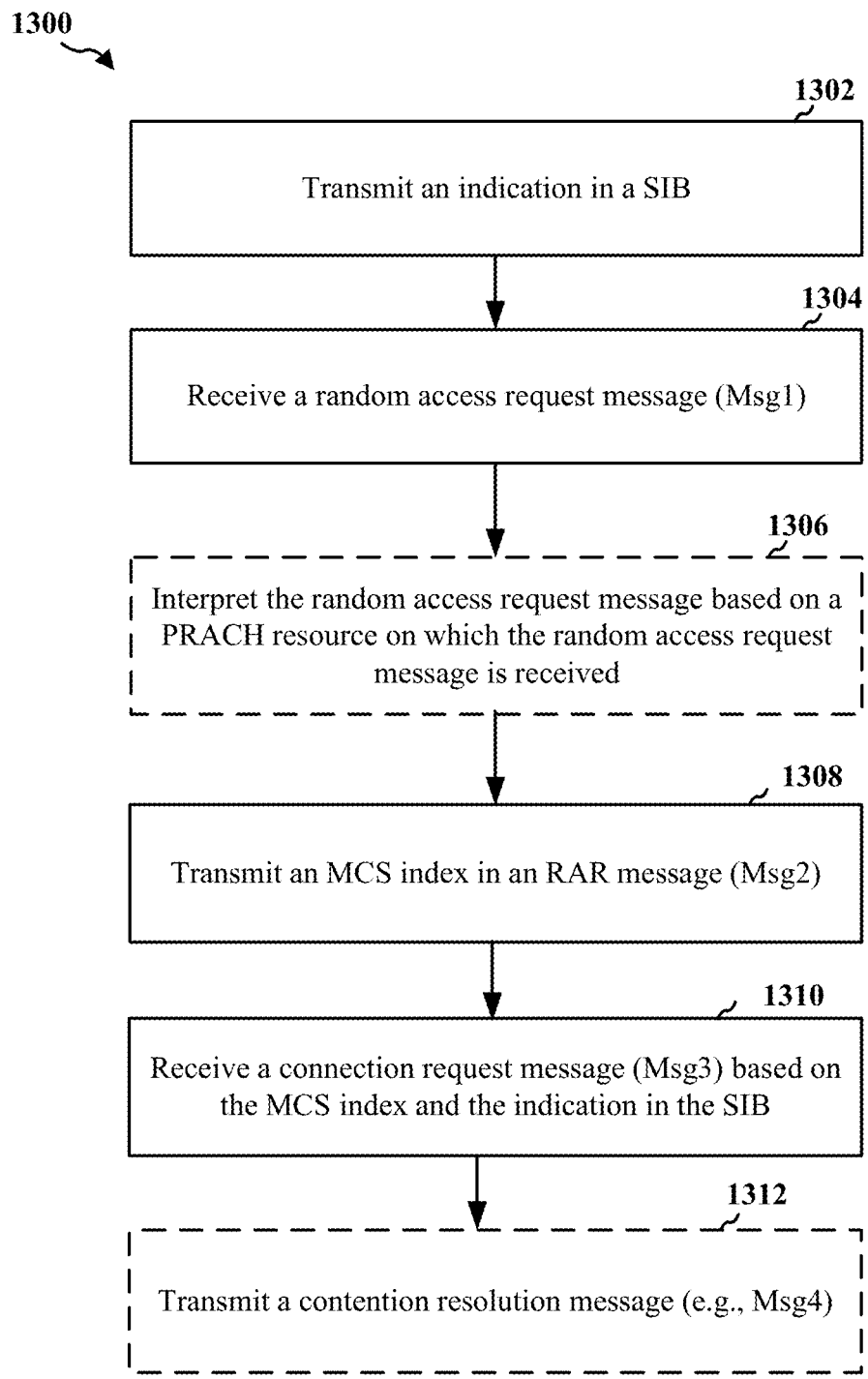
FIG. 13 is a flowchart of yet another example method of wireless communication.

FIG. 13 is a flowchart 1300 of a method of wireless communication. The method may be performed by a base station (e.g., the base station 102, 180, 310, 404). The base station may comprise a base station performing NB-IoT wireless communication or eMTC wireless communication. Optional aspects are illustrated with a dashed line/dashed box.

At 1302, the base station may transmit an indication of at least one parameter, e.g., associated with a random access response grant, in a SIB. For example, with reference to FIG. 6, the base station 404 may transmit the SIB 604 including information that may allow the UE 402 to perform early data transmission (e.g., when the UE 402 may have a data to transmit during the RACH procedure). As discussed supra, in accordance with one aspect, the transmitted indication in the SIB may allow the UE to interpret the RAR in a manner that allows early data transmission, e.g., transmission of data in the connection request (Msg3). As discussed supra, the indication in the SIB may communicate various types of information and/or parameters values in various configurations. For example, in one configuration, the indication may comprise a table entry/parameter value (e.g., a value for a parameter such as TBS, $N_{RU}$, modulation, etc.) corresponding to an unassigned MCS index. In another example, the indication in the SIB may comprise a TBS value corresponding to an unassigned MCS index. In another example, the indication may comprise a scaling value (e.g., a multiplier) that may be used to scale a number of resource units and/or a TBS value corresponding to an MCS index indicated in a RAR. Various other examples are discussed infra. In various configurations, the at least one parameter transmitted in the SIB may comprise different parameters for different supported coverage levels.

At 1304, the base station may receive a random access request message (e.g., Msg1) from a UE. For example, with reference to FIG. 6, the base station 404 may receive the random access request (Msg1) 606 from the UE 402. In some configurations, the SIB may indicate PRACH (e.g., NPRACH) resources for transmitting a random access request message (Msg1) and corresponding/associated maximum transport block sizes for Msg3 transmission. In one such configuration, the UE may select a PRACH resource (from the resources indicated in the SIB) for transmitting the random access request. In such an example, the random access request message (Msg1) may be received by the base station on the PRACH resource selected by the UE based on the SIB indication and a payload size (of Msg3).

In one configuration, at 1306, the base station may interpret the received random access request message (Msg1) from the UE based on a PRACH resource on which the random access request message is received. For example, as discussed above, in some configurations the UE may transmit the random access request on a PRACH resources that may be associated or correlated with a transport block size for Msg3 transmission (as may be indicated in the SIB). In some such cases, the base station may interpret, e.g., analyze, the random access request message (Msg1) from the UE based on the PRACH/NPRACH resource on which the Msg1 is received. For example, based on the resource on which the Msg1 is received, the base station may be able to determine that the payload size of Msg3 that the UE intends to transmit. In one configuration, based on the interpretation of the random access request message from the UE, the base station may determine a grant and/or MCS index that may be sent to the UE in a RAR (Msg2) in response to the random access request message (Msg1).

At 1308, the base station may transmit an MCS index in a random access response message (e.g., Msg2) to the UE. For example, with reference to FIG. 6, the base station 404 may transmit the random access response message (Msg2) 608 to the UE 402 in response to the random access request message (Msg1).

At 1310, the base station may receive, from the UE, a connection request message based on the MCS index and the indication in the SIB. The connection request message may comprise an RRC connection request (Msg3). For example, with reference to FIG. 6, the base station 404 may receive the connection request message (Msg3) 610 from the UE 402 based on the MCS index in the RAR 608, and the information in the SIB transmitted by the base station 404 which may provide indication of one or more parameter values (e.g., such as TBS or other information discussed supra) that may be used for early data transmission in Msg3. In some configurations, the received connection request message (Msg3) 610 from the UE may have a payload size that is different (e.g., higher or lower) than a normal payload size allowed for Msg3. In one example, the indication in the SIB transmitted by the base station may comprise a TBS value corresponding to an unassigned MCS index (e.g., 011), and the MCS index (in the transmitted RAR) may comprise the unassigned MCS index 011. The UE may use the SIB indication and MCS index to send the connection request message to the base station. In such an example, the connection request message received by the base station may be based on a predefined number of resource units and the TBS value indicated in the SIB as discussed supra (e.g., in connection with FIGS. 6 and 9). Thus, in such an example, the base station may receive the connection request message based on the indicated TBS in the SIB and the predefined number of resource units (e.g., determined based on the predefined table using the MCS index received in the RAR message transmitted by the base station).

In another example, the indication transmitted in the SIB at 1302 may comprise a scaling value. In this example, the connection request message may be received by the base station based on a number of resource units corresponding to the MCS index that has been scaled by the scaling value received in the SIB. For example, the SIB may indicate a multiplicative value of 2, and the UE may scale the number of resource units for the connection request message by multiplying the number of resource units corresponding to the MCS index by 2.

In another example, the indication transmitted in the SIB at 1302 may comprise a scaling value, and the connection request message may be received by the base station based on a TBS corresponding to the MCS index (indicated in the RAR) that has been scaled by the scaling value transmitted in the SIB.

In yet another example, the indication transmitted in the SIB at 1302 may comprise parameters for an unassigned MCS index. The MCS index transmitted by the base station in the RAR may comprise the unassigned MCS index. In this example, the base station may receive the connection request message based on the parameters indicated in the SIB corresponding to the unassigned MCS index. In some configurations, the SIB may include a set of entries (e.g., values for parameters) for more than one unassigned MCS index, e.g., for each of the reserve MCS indexes.

In another example, the indication transmitted in the SIB at 1302 may comprise a TBS value (e.g., 600 bits) corresponding to an unassigned MCS index (e.g., MCS index 100), and the MCS index transmitted to the UE in the RAR may comprise the unassigned MCS index. In this example, the base station may receive the connection request message based on a predefined number of resource units (e.g., in a table that specifies $N_{RU}$s to be used for a given MCS index and/or TBS) and the TBS value indicated in the SIB. Thus, in some configurations, the table may specify the number of RUs, while the SIB signals the corresponding TBS to the UE.

As briefly discussed supra, in some configuration, the indication transmitted at 902 may comprise a first indication of a first set of PRACH resources associated with a first TBS and a second indication of a second PRACH resources associated with a second TBS. The first and second TBS may indicate the transport block sizes for transmission of the connection request (and not for transmission of the random access request (Msg1) which is transmitted using a selected one of the first and second PRACH resources). In this example, the base station may receive the random access request message (Msg1) from the user equipment based on a PRACH resource selected by the UE based on the PRACH resources indicated in the SIB. In some configurations, the PRACH resource sets may comprise NPRACH resource sets, e.g., narrowband PRACH resources.

In some configurations, at 1312, the base station may transmit a contention resolution message (Msg4) in response to the received connection request message (Msg3) from the UE. In some configurations, the transmitted contention resolution message may terminate/complete the random access procedure and may include a contention resolution identifier.

Figure 14:
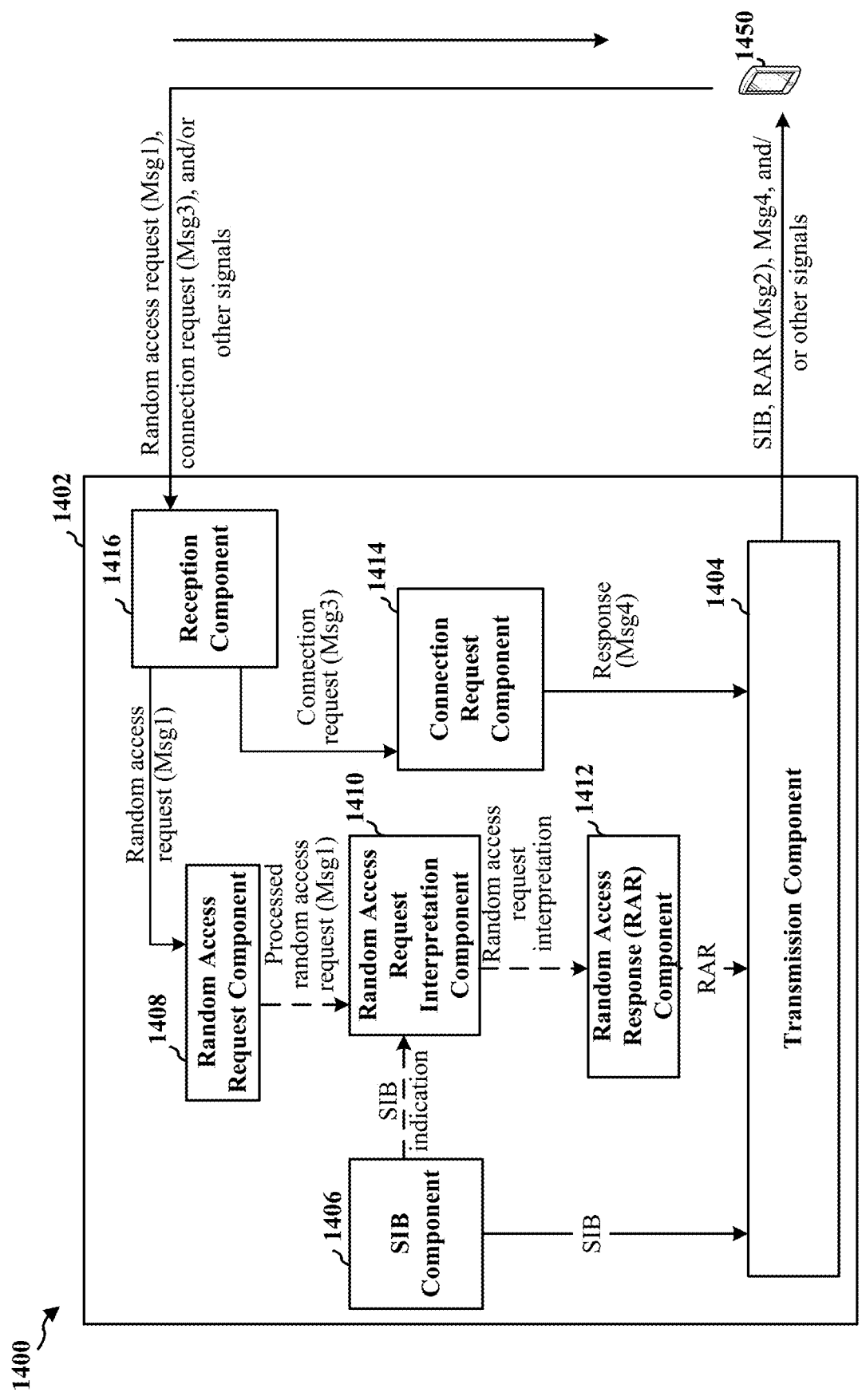
FIG. 14 is a conceptual data flow diagram illustrating the data flow between different means/components in an example apparatus, e.g., a base station.

FIG. 14 is a conceptual data flow diagram 1400 illustrating the data flow between different means/components in an example apparatus 1402. The apparatus 1402 may be a base station (e.g., such as base station 102, 180, 310, 404). The apparatus 1402 may include a transmission component 1404, a SIB component 1406, a random access request component 1408, a random access request interpretation component 1410, a random access response component 1412, a connection request/response component 1414, and a reception component 1416.

The transmission component 1404 may be configured to transmit various messages to one or more external devices, e.g., including the UE 1450, in accordance with the methods disclosed herein. The messages/signals to be transmitted may be generated by one or more other components of the apparatus discussed below, or the messages/signals to be transmitted may be generated by the transmission component 1404 under the direction/control of the one or more other components (e.g., such as components 1406, 1412 and/or 1414). Thus, in various configurations, via the transmission component 1404, the apparatus 1402 and/or one or more component therein transmit signals and/or other information (e.g., such as the SIB, random access response (Msg2), connection request response (Msg4), control messages and/or other signals) to external devices such as the UE 1450 as discussed infra.

In one configuration, the SIB component 1104 may be configured to generate and transmit (e.g., via the transmission component 1404) a SIB including an indication of at least one parameter (e.g., associated with an RAR grant) as discussed supra. In some configurations, the indication transmitted in the SIB may comprise one or more parameters for an unassigned MCS index. In some configurations, the indication may comprise a TBS value corresponding to an unassigned MCS index. In some configurations, the indication in the SIB may comprise a first indication of a first set of PRACH resources associated with a first TBS and a second indication of a second set of PRACH resources associated with a second TBS. In some configurations, the first TBS and the second TBS may respectively correspond to maximum payload sizes for a connection request (Msg3). The indication transmitted in the SIB may also comprise different types of information as discussed supra in connection with FIG. 13.

The random access request component 1408 may be configured to receive (e.g., via the reception component 1416) and process a random access request (Msg1) from the UE 1450. In some configurations, the random access request may be receiver over a PRACH resource from the PRACH resources indicated in the SIB. As discussed supra, the PRACH resource may be selected by the UE 1450 based on PRACH resources indicated in the SIB and a payload size to be transmitted (e.g., in Msg3). In some other configurations, the random access request may be received on a PRACH not necessarily indicated in the SIB, but which may be known to the apparatus 1402. In some configurations, the processed random access request may be provided to the random access request interpretation component 1410.

In some configurations, the random access request interpretation component 1410 may be configured to interpret the received random access request (Msg1) from the UE 1450 based on the PRACH resource on which the random access request message is received, as discussed supra in more detail in connection with flowchart 1300 and elsewhere above.

The random access response component 1412 may be configured to generate and transmit (e.g., via the transmission component 1404) a random access response (Msg2) comprising an MCS index to the UE 1450 (e.g., in response to the received random access request). The random access response may comprise grant related information for the UE 1450 to transmit a connection request (Msg3) to the apparatus 1402.

In some configurations, the connection request component 1414 may be configured to receive (e.g., via the reception component 1416) and process the connection request (Msg3) from the UE 1450 in accordance with the methods described herein supra. In various configurations, the connection request component 1414 may be configured to receive (via the reception component 1416) the connection request from the UE 1450 based on the MCS index (transmitted by the apparatus 1402 in the RAR) and the indication (transmitted by the apparatus 1402 in the SIB). In one example, the indication in the SIB may comprise a table entry/value for a parameter (e.g., TBS, $N_{RU}$, modulation, etc.) corresponding an unassigned/reserved MCS index, and the MCS index transmitted in the RAR may comprise the unassigned MCS index. In such an example, the connection request message may be received (via the reception component 1416) based on the parameter(s) value (corresponding to the unassigned MCS index in the RAR) transmitted in the SIB. In another example configuration, the indication in the SIB may comprise a TBS value corresponding to an unassigned MCS index, and the MCS index transmitted in the RAR may comprise the unassigned MCS index. In such an example, the connection request message may be received (via the reception component 1416) based on a predefined number of resource units and the TBS value received in the SIB. In another example, the indication may comprise a scaling value (e.g., a multiplier), and the connection request message may be received (via the reception component 1416) based on a number of resource units and/or a TBS value, corresponding to the MCS index indicated in the RAR, scaled by the scaling value indicated in the SIB as discussed in more detail supra. The connection request component 1414 may be configured to generate and transmit (e.g., via the transmission component 1404) a contention resolution/response (Msg4) to the UE 1450 (e.g., in response to the received connection request).

The reception component 1404 may be configured to receive signals and/or other information from other devices including, e.g., UE 1450. The signals/information received by the reception component 1404 may be provided to one or more components of the apparatus 1402 for further processing and use in performing various operations in accordance with the methods discussed supra including the method of flowchart 1300. Thus, via the reception component 1404, the apparatus 1402 and/or one or more component therein, receive signals and/or other information (e.g., such as a random access request (Msg1), a connection request (Msg3), data and/or other signals) from external devices such as the UE 1450.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
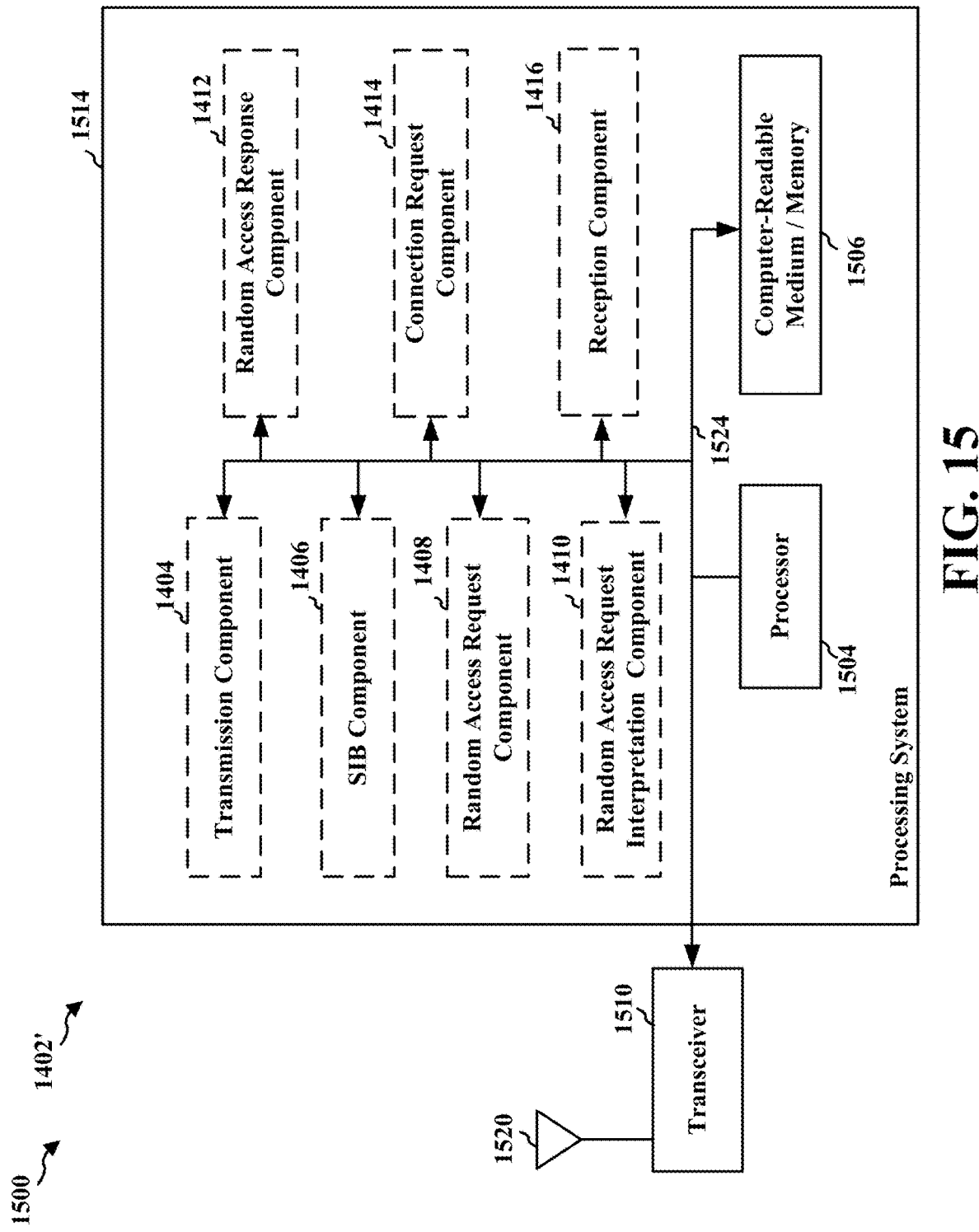
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1416. In addition, the transceiver 1510 receives information from the processing system 1514, specifically the transmission component 1404, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, and 1416. The components may be software components running in the processor 1504, resident/stored in the computer-readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375.

In one configuration, the apparatus 1402/1402' is, e.g., a base station, for wireless communication including means for performing the aspects described in connection with FIG. 13. In one configuration, the apparatus 1402/1402' for wireless communication includes means for transmitting an indication of at least one parameter associated with a random access response grant in a SIB. The apparatus 1402/1402' may further comprise means for receiving a random access request from a U. The apparatus 1402/1402' may further comprise means for transmitting an MCS index in a random access response to the UE. The apparatus 1402/1402' may further comprise means for receiving, from the UE, a connection request message based on the MCS index and the indication in the SIB.

In some configurations, the indication may comprise one or more parameters for an unassigned MCS index, and the MCS index transmitted to the UE may comprise the unassigned MCS index. In some such configurations, the means for receiving the connection request message may be further configured to receive the connection request message based on the one or more parameters in the SIB.

In some configurations, the indication may comprise a TBS value corresponding to an unassigned MCS index, and the MCS index transmitted to the UE may comprise the unassigned MCS index. In some such configurations, the means for receiving the connection request message may be further configured to receive the connection request message based on a predefined number of resource units and the TBS value in the SIB.

In some configurations, the indication may comprise a first indication of a first set of PRACH resources associated with a first TBS and a second indication of a second set of PRACH resources associated with a second TBS. In some such configurations, the apparatus 1402/1402' may further comprise means for interpreting the random access request from the UE based on a PRACH resource on which the random access request is received.

In some configurations, the indication may comprise a scaling value. In some such configurations, the means for receiving the connection request message may be further configured to receive the connection request message based on a number of resource units corresponding to the MCS index that has been scaled by the scaling value indicated in the SIB.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means The processing system may include a processor coupled to a computer-readable medium/memory. The processor is responsible for general processing, including the execution of software stored on the computer-readable medium/memory. The software, when executed by the processor, causes the processing system to perform the various functions described supra for any particular apparatus. The computer-readable medium/memory may also be used for storing data that is manipulated by the processor when executing software. The processing system may further include at least one of the component configured to perform the method of FIG. 10. The components may be software components running in the processor, resident/stored in the computer readable medium/memory, one or more hardware components coupled to the processor, or some combination thereof. The processing system may be a component of the eNB 310 and may include the memory 376 and/or at least one of the TX processor 316, the RX processor 370, and the controller/processor 375.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving an indication of at least one parameter in a System Information Block (SIB) from a base station, wherein the indication indicates a transport block size (TBS) value corresponding to an unassigned Modulation and Coding Scheme (MCS) index;
    transmitting a random access request to the base station;
    receiving an MCS index in a random access response (RAR) from the base station, wherein the MCS index received in the RAR corresponds to the unassigned MCS index; and
    transmitting a connection request message to the base station using a number of resource units based on the MCS index and the TBS value indicated in the SIB.

2. The method of claim 1, further comprising:
    processing the RAR from the base station based on the indication received in the SIB.

3. A method of wireless communication at a user equipment (UE), comprising:
    receiving an indication of at least one parameter in a System Information Block (SIB) from a base station, wherein the indication indicates a random access response (RAR) parameters corresponding to an unassigned Modulation and Coding Scheme (MCS) index;
    transmitting a random access request to the base station;

receiving a MCS index in a random access response (RAR) from the base station, wherein the MCS index received in the RAR corresponds to the unassigned MCS index; and transmitting a connection request message to the base station based on the MCS index and the RAR parameters received in the SIB.

4. The method of claim 1, wherein the at least one parameter comprises different parameters for different supported coverage levels.

5. The method of claim 1, wherein the indication comprises a first indication of a first set of Physical Random Access Channel (PRACH) resources associated with a first Transport Block Size (TBS) and a second indication of a second set of PRACH resources associated with a second TBS, the method further comprising:

selecting a PRACH resource, from one of the first set of PRACH resources or the second set of PRACH resources, based on a payload size at the UE, wherein the random access request is transmitted using the selected PRACH resource; and interpreting the RAR from the base station based on the PRACH resource used to transmit the random access request.

6. A method of wireless communication at a user equipment (UE), comprising:

receiving an indication of at least one parameter in a System Information Block (SIB) from a base station, wherein the indication comprises a scaling value;

transmitting a random access request to the base station:

receiving a Modulation and Coding Scheme (MCS) index in a random access response (RAR) from the base station; and transmitting a connection request message to the base station based on the MCS index and a number of resource units corresponding to the MCS index that has been scaled by the scaling value received in the SIB.

7. A method of wireless communication at a user equipment (UE), comprising:

receiving an indication of at least one parameter in a System Information BLock (SIB) from a base station, wherein the indication comprises a scaling value;

transmitting a random access request to the base station;

reeiving a Modulation and Coding Scheme (MCS) index in a rndom access response (RAR) from the base station; and transmitting a connection request message to the base station based on the MCS index and a transport block size corresponding to the MCS index that has been scaled by the scaling value received in the SIB.

8. A user equipment (UE), comprising:

means for receiving an indication of at least one parameter in a System Information Block (SIB) from a base station, wherein the indication indicates a transport block size (TBS) value corresponding to an unassigned Modulation and Coding Scheme (MCS) index;

means for transmitting a random access request to the base station;

means for receiving an MCS index in a random acess reponse (RAR) from the base station, wherein the MCS index received in the RAR correponds to the unassigned MCS index; and means for transmitting a connection request message to the base sttion using a number of resource units based on the MCS index and the TBS value indicated in the SIB.

9. The UE of claim 8, further comprising:

means for processing the RAR from the base station based on the indication received in the SIB.

10. A user equipment (UE), comprising:

means for receiving an indication of at least one parameter in a System Information Block (SIB) from a base station, wherein the indication indicates a random access reqponse (RAR) parameters corresponding to an unassigned Modulation and Coding Scheme (MCS) index;

means for transmitting a random access request to the base station;

means for receiving a MCS index in a RAR from the base station, wherein the MCS index received in the RAR corresponds to the unassigned MCS index; and means for transmitting a connection request message to the base station based on the MCS index and the RAR parameters received in the SIB.

11. The UE of claim 8, wherein the at least one parameter comprises different parameters for different supported coverage levels.

12. The UE of claim 8, wherein the indication comprises a first indication of a first set of Physical Random Access Channel (PRACH) resources associated with a first Transport Block Size (TBS) and a second indication of a second set of PRACH resources associated with a second TBS, and wherein the UE further comprises:

means for selecting a PRACH resource, from one of the first set of PRACH resources or the second set of PRACH resources, based on a payload size at the UE, wherein the means for transmitting the random access request is further configured to transmit the random access request using the selected PRACH resource; and means for interpreting the RAR from the base station based on the PRACH resource used to transmit the random access request.

13. A user equipment (UE), comprising:

means for receiving an indication of at least one parameter in a System Information Block (SIB) from a base station, wherein the indication comprises a scaling value;

means for transmitting a random access request to the base station;

means for receiving a Modulation and Coding Scheme (MCS) index in a random access response (RAR) from the base station; and means for transmitting a connection request message to the base station based on the MCS index and a number of resource units corresponding to the MCS index that has been scaled by the scaling value received in the SIB.

14. A user equipement (UE), comprising:

means for receiving an indication of at least one parameter in a System Information Block (SIB) from a base station, wherein the indication comprises a scaling value;

means for transmitting a random access request to the bae station;

means for receiving a Modulation and Coding Scheme (MCS) index in a random access response (RAR) from the base station; and means for transmitting a connection request message to the base station based on the MCS index and a transport block size corresponding the the MCS index that has been scaled by the scaling value received in the SIB.

15. A user equipment (UE), comprising:
a memory; and
at least one processor coupled to the memory and configured to:
receive an indication of at least one parameter in a System Information Block (SIB) from a base station, wherein the indication indicates a transport block size (TBS) value corresponding to an unasigned Modulation and Coding Scheme (MCS) index;
transmit a random access request to the base station;
receive an MCS index in a random access response (RAR) from the base station, wherein the MCS index received in the RAR corresponds to the unassigned MCS index; and
transmit a connection request message to the base station using a number of resource units based on the MCS index and the TBS value indicated in the SIB.

16. The UE of claim 15, wherein the at least one processor is further configured to process the RAR from the base station based on the indication received in the SIB.

17. A user equipment (UE), comprising:
a memory; and
at least one processor coupled to the memory and configured to:
receive an indication of at least one parameter in a System Information Block (SIB) from a base station, wherein the indication indicates a random access response (RAR) parameters corresponding to an unassigned Modulation and Coding Scheme (MCS) index;
transmit a random access request to the base station;
receive a MCS index in a RAR from the base station, wherein the MCS index received in the RAR corresponds to the unassigned MCS index; and
transmit a connection request message to the base station based on the MCS index and the RAR parameters received in the SIB.

18. The UE of claim 15, wherein the at least one parameter comprises different parameters for different supported coverage levels.

19. The UE of claim 15, wherein the indication comprises a first indication of a first set of Physical Random Access Channel (PRACH) resources associated with a first Transport Block Size (TBS) and a second indication of a second set of PRACH resources associated with a second TBS, and
wherein the at least one processor is further configured to:
select a PRACH resource, from one of the first set of PRACH resources or the second set of PRACH resources, based on a payload size at the UE and transmit the random access request using the selected PRACH resource; and
interpret the RAR from the base station based on the PRACH resource used to transmit the random access request.

20. A user equipment (UE), comprising:
a memory; and
at least one processor coupled to the memory and configured to;
receive an indication of at least one parameter in a System Information BLock (SIB) from a base station, wherein the indication comprises a scaling value;
transmit a random access request to the base station;
receive a Modulation and Coding Scheme (MCS) index in a random access response (RAR) from the base station; and
transmit a connecton request message to the base station based on the MCS index and a number of resource units corresponding to the MCS index that has been scaled by the scaling value received in the SIB.

21. A user equipment (UE), comprising:
a memory; and
at least one processor coupled to the memory and configured to;
receive an indication of at least one parameter in a System Information Block (SIB) from a base station, wherein the indication comprises a scaling value;
transmit a random access request to the base station;
receive a Modulation and Coding Scheme (MCS) index in a random access response (RAR) from the base station; and
transmit a connection request message to the base station based on the MCS index and a transport block size corresponding to the MCS index that has been scaled by the scaling value received in the SIB.

22. A non-transitory computer-readable medium storing computer executable code for wireless communication at a user equipment, comprising code to:
receive an indication of at least one parameter in a System Information Block (SIB) from a base station, wherein the indication indicates a transport block size (TBS) value corresponding to an unsassigned Modulation and Coding Scheme (MCS) index;
transmit a random access request to the base station;
receive an MCS index in a random access response from the base station, wherein the MCS index received in the RAR corresponds to the unassigned MCS index; and
transmit a connection request message to the base station using a number of resource units based on the MCS index and the TBS value indicated in the SIB.

23. A method of wireless communication at a base station, comprising:
transmitting an indication of at least one parameter associated with a random access response grant in a System Information Block (SIB), wherein the indication indicates a transport block size (TBS) value corresponding to an unassigned Modulation and Coding Scheme (MCS) index;
receiving a random access request from a user equipment (UE);
transmitting an MCS index in a random access response (RAR) to the UE, wherein the MCS index transmitted in the RAR corresponds to the unassigned MCS index; and
receiving, from the UE, a connection request message using a number of resource units based on the MCS index and the TBS value indicated in the SIB.

24. A method of wireless communication at a base station, comprising:
transmitting an indication of at least one parameter associated with a random access response grant in a System Information Block (SIB), wherein the indication indicates a random access response (RAR) parameters corresponding to an unassigned Modulation and Coding Scheme (MCS) index;
receiving a random access request from a user equipment (UE);
transmitting a MCS index in a RAR to the UE, wherein the MCS index transmitted in the RAR corresponds to the unassigned MCS index; and receiving, from the UE, a connection request message based on the MCS index and the RAR parameters in the SIB.

25. The method of claim 23, wherein the indication comprises a first indication of a first set of Physical Random Access Channel (PRACH) resources associated with a first Transport Block Size (TBS) and a second indication of a second set of PRACH resources associated with a second TBS, the method further comprising:
interpreting the random access request from the UE based on a PRACH resource on which the random access request is received.

26. The method of claim 23, wherein the indication comprises a scaling value, and wherein the connection request message is received based on a number of resource units corresponding to the MCS index that has been scaled by the scaling value indicated in the SIB.

27. The method of claim 23, wherein the at least one parameter comprises different parameters for different supported coverage levels.

28. A base station comprising:
a memory; and
at least one processor coupled to the memory and configured to:
transmit an indication of at least one parameter associated with a random access response grant in a System Information Block (SIB), wherein the indication indicates a transport block size (TBS) value corresponding to an unassigned Modulation and Coding Scheme (MCS) index;
receive a random access request from a user equipment (UE);
transmit an MCS index in a random access response (RAR) to the UE, wherein the MCS index transmitted in the RAR corresponds to the unassigned MCS index; and
receive, from the UE, a connection request message based on the MCS index and the TBS value indicated in the SIB.

29. A base station comprising:
a memory; and
at least one processor coupled to the memory and configured to:
transmit an indication of at least one parameter associated with a random access response grant in a System Information Block (SIB), wherein the indication indicates a random access response (RAR) parameters corresponding to an unassigned Modulation and Coding Scheme (MCS) index;
receive a random access request from a user equipment (UE);
transmit a MCS index in a RAR to the UE, wherein the MS index transmitted in the RAR corresponds to the unassigned MCS index; and
receive, from the UE, a connection request message based on the MCS index and the RAR parameters in the SIB.

30. The base station of claim 28, wherein the indication comprises a first indication of a first set of Physical Random Access Channel (PRACH) resources associated with a first Transport Block Size (TBS) and a second indication of a second set of PRACH resources associated with a second TBS; and
wherein the at least one processor is further configured to interpret the random access request from the UE based on a PRACH resource on which the random access request is received.

31. A base station comprising:
a memory; and
at least one processor coupled to the memory and configured to:
transmit an indication of at least one parameter associated with a random access response grant in a System Information Block (SIB), wherein the indication comprises a scaling value;
receive a random access request from a user equipment (UE);
transmit a Modulation and Coding Scheme (MCS) index in a random access response (RAR) to the UE; and
receive, from the UE, a connection request message based on the MCS index and a number of resource units correspoinding to the MCS index that has been scaled by the scaling value received in the SIB.

32. The base station of claim 28, wherein the at least one parameter comprises different parameters for different supported coverage levels.

33. A base station comprising:
means for transmitting an indication of at least one parameter associated with a random access response grant in a System Information Block (SIB), wherein the indication indicates a transport block size (TBS) value corresponding to an unassigned Modulation and Coding Scheme (MCS) index;
means for receiving a random access request from a user equipment (UE);
means for transmitting an MCS index in a random access response (RAR) to the UE, wherein the MCS index transmitted in the RAR corresponds to the unassigned MCS index; and
means for receiving, from the UE, a connection request message based on the MCS index and the TBS value indicated in the SIB.

34. A base station comprising:
means for transmitting an indication of at least one parameter associated with a random access response grant in a System Information Block (SIB), wherein the indication indicates a random access response (RAR) parameters corresponding to an unassigned Modulation and Coding Scheme (MCS) index;
means for receiving a random access request from a user equipment (UE);
means for transmitting a MCS index in a RAR to the UE, wherein the MCS index transmitted in the RAR correspoinds to the unassigned MCS index; and
means for receiving, from the UE, a connection reqeust message based on the MCS index and the RAR parameters in the SIB.

35. The base station of claim 33, wherein the indication comprises a first indication of a first set of Physical Random Access Channel (PRACH) resources associated with a first Transport Block Size (TBS) and a second indication of a second set of PRACH resources associated with a second TBS; and
wherein the base station further comprises means for interpreting the random access request from the UE based on a PRACH resource on which the random access request is received.

36. A base station comprising:
means for transmitting an indication of at least one parameter associated with a random access respoinse grant in a System Information Block (SIB), wherein the indication comprises a scaling value;

means for receiving a random access request from a user equipment (UE);

means for transmitting a Modulation and Coding Scheme (MCS) index in a random access response (RAR) to the UE; and means for receiving, from the UE, a connection request message based on the MCS index and a number of resource units corresponding to the MCS index that has been scaled by the scaling value indicated in the SIB.

37. A non-transitory computer-readable medium storing computer executable code for wireless communication at a base station, comprising code to:

transmit an indication of at least one parameter associated with a random access response grant in a System Information Block (SIB), wherein the indication indicates a transport block size (TBS) value corresponding to an unassigned Modulation and Coding Scheme (MCS) index;

receive a random access request from a user equipment (UE);

transmit an MCS index in a random access response (RAR) to the UE, wherein the MCS index transmitted in the RAR corresponds to the unassigned MCS index; and receive, from the UE, a connection request message based on the MCS index and the TBS value indicated in the SIB.

* * * * *